United States Patent
Nishimura et al.

(10) Patent No.: US 10,203,136 B2
(45) Date of Patent: Feb. 12, 2019

(54) AIR CONDITIONING SYSTEM AND METHOD FOR CONTROLLING SAME

(71) Applicant: DAIKIN INDUSTRIES, LTD., Osaka-shi, Osaka (JP)

(72) Inventors: Tadafumi Nishimura, Sakai (JP); Kousuke Kibo, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/025,523

(22) PCT Filed: Sep. 4, 2014

(86) PCT No.: PCT/JP2014/073289
§ 371 (c)(1),
(2) Date: Mar. 28, 2016

(87) PCT Pub. No.: WO2015/045777
PCT Pub. Date: Apr. 2, 2015

(65) Prior Publication Data
US 2016/0238268 A1    Aug. 18, 2016

(30) Foreign Application Priority Data

Sep. 30, 2013 (JP) ................................ 2013-204146

(51) Int. Cl.
*F24F 11/00* (2018.01)
*F25B 13/00* (2006.01)
(Continued)

(52) U.S. Cl.
CPC .............. *F25B 13/00* (2013.01); *F24F 3/065* (2013.01); *F24F 11/30* (2018.01); *F24F 11/62* (2018.01);
(Continued)

(58) Field of Classification Search
CPC ....... F24F 2011/0064; F24F 2011/0065; F24F 11/006; F24F 11/0012; F24F 11/62;
(Continued)

(56) References Cited

U.S. PATENT DOCUMENTS 4,482,009 A * 11/1984 Nishimura ......... B60H 1/00842
165/100
4,487,028 A * 12/1984 Foye ..................... F25B 49/022
165/218
(Continued)

FOREIGN PATENT DOCUMENTS

| CN | 101484761 A | 7/2009 |
| CN | 101666530 A | 3/2010 |

(Continued)

OTHER PUBLICATIONS

JP 01174844 A abstract translation.*
(Continued)

*Primary Examiner* — Frantz Jules
*Assistant Examiner* — Nelson Nieves
(74) *Attorney, Agent, or Firm* — Global IP Counselors, LLP

(57) ABSTRACT

An air conditioning system includes a plurality of indoor units installed in the same indoor space, an outdoor unit and a control device. The indoor units include respective usage-side heat exchangers capable of setting set temperatures individually. The outdoor unit includes a heat-source-side heat exchanger conducting heat exchange with refrigerant circulating through the usage-side heat exchangers. The control device calculates a representative temperature related value shared by the indoor units using the set temperatures of the indoor units, and switches the indoor units between thermo-ON and thermo-OFF based on the representative temperature related value. The control device
(Continued)

calculates the representative temperature related value based on a plurality of temperature differences between the set temperatures and control temperatures in the indoor units.

13 Claims, 6 Drawing Sheets

(51) Int. Cl.

| | | |
|---|---|---|
| *F24F 3/06* | (2006.01) | |
| *F25B 43/00* | (2006.01) | |
| *F24F 11/30* | (2018.01) | |
| *F24F 11/62* | (2018.01) | |
| *F24F 110/10* | (2018.01) | |
| *F24F 140/12* | (2018.01) | |
| *F24F 120/20* | (2018.01) | |
| *F24F 11/65* | (2018.01) | |
| *F24F 11/56* | (2018.01) | |
| *F24F 11/77* | (2018.01) | |
| *F24F 11/84* | (2018.01) | |

(52) U.S. Cl.
CPC ............. *F25B 43/006* (2013.01); *F24F 11/56* (2018.01); *F24F 11/65* (2018.01); *F24F 11/77* (2018.01); *F24F 11/84* (2018.01); *F24F 2110/10* (2018.01); *F24F 2120/20* (2018.01); *F24F 2140/12* (2018.01); *F25B 2313/0233* (2013.01); *F25B 2313/02741* (2013.01)

(58) Field of Classification Search
CPC ........ F24F 11/30; F24F 2110/10; F24F 11/65; F25B 2313/023; G05D 23/193
See application file for complete search history.

(56) References Cited

U.S. PATENT DOCUMENTS

| | | | | |
|---|---|---|---|---|
| 5,303,767 A * | 4/1994 | Riley | ............... | F24F 3/044 165/208 |
| 5,349,167 A * | 9/1994 | Simcock | ............... | F27B 14/061 219/656 |
| 5,743,104 A * | 4/1998 | Kim | ............... | F25D 17/065 236/91 E |
| 5,803,357 A * | 9/1998 | Lakin | ............... | G01K 1/026 236/78 B |
| 6,052,999 A * | 4/2000 | Park | ............... | F24F 13/12 165/288 |
| 6,114,671 A * | 9/2000 | Wehner | ............... | G05D 23/1934 219/483 |
| 6,378,317 B1 * | 4/2002 | Ribo | ............... | F24F 3/00 236/1 B |
| 6,591,622 B1 * | 7/2003 | Gherman | ............... | F25D 29/00 165/265 |
| 2004/0074244 A1 * | 4/2004 | Ichishi | ............... | B60H 1/00742 62/186 |
| 2005/0115258 A1 * | 6/2005 | Violand | ............... | F24F 11/001 62/186 |
| 2006/0196953 A1 * | 9/2006 | Simon | ............... | G05D 23/1934 236/46 R |
| 2008/0168786 A1 * | 7/2008 | Eichholz | ............... | B64D 13/00 62/208 |
| 2008/0276635 A1 | 11/2008 | Terasaki et al. | | |
| 2009/0108082 A1 * | 4/2009 | Goldmann | ............... | F24F 11/0012 236/49.1 |
| 2009/0158759 A1 * | 6/2009 | Seo | ............... | F24F 3/065 62/159 |
| 2010/0299099 A1 * | 11/2010 | Yamaoka | ............... | F24F 11/0001 702/130 |
| 2011/0016893 A1 * | 1/2011 | Dawes | ............... | F25B 49/02 62/89 |
| 2013/0067944 A1 | 3/2013 | Kibo | | |
| 2014/0026604 A1 * | 1/2014 | Yoshimura | ............... | F24F 11/0012 62/180 |
| 2014/0216704 A1 * | 8/2014 | Wen | ............... | F24F 11/006 165/201 |
| 2014/0263678 A1 * | 9/2014 | Schnell | ............... | F24F 11/0012 236/47 |
| 2014/0358296 A1 * | 12/2014 | Kaneko | ............... | F24F 11/008 700/278 |
| 2015/0013365 A1 * | 1/2015 | Yabuta | ............... | F24F 11/0012 62/190 |
| 2015/0021005 A1 * | 1/2015 | Land, III | ............... | F24F 11/0012 165/214 |
| 2015/0027144 A1 * | 1/2015 | Lee | ............... | F24F 11/0086 62/80 |
| 2015/0068237 A1 * | 3/2015 | Haikawa | ............... | F25D 17/06 62/207 |
| 2015/0192938 A1 * | 7/2015 | Lee | ............... | F24F 11/006 700/276 |
| 2015/0247646 A1 * | 9/2015 | Song | ............... | F24F 11/006 700/276 |
| 2015/0354851 A1 * | 12/2015 | Yoshii | ............... | H05K 7/2079 62/179 |

FOREIGN PATENT DOCUMENTS

| | | | | |
|---|---|---|---|---|
| EP | 1624257 A2 * | 2/2006 | ............. | F24F 3/065 |
| EP | 1 956 306 A2 | 8/2008 | | |
| JP | 01174844 A * | 7/1989 | ............. | F24F 11/02 |
| JP | 7-98143 A | 4/1995 | | |
| JP | 2002-61925 A | 2/2002 | | |
| JP | WO 2011142234 A1 * | 11/2011 | ............. | F24F 11/008 |
| JP | 2011-257126 A | 12/2011 | | |
| JP | 2012-149858 A | 8/2012 | | |

OTHER PUBLICATIONS

International Search Report of corresponding PCT Application No. PCT/JP2014/073289 dated Nov. 25, 2014.
European Search Report of corresponding EP Application No. 14 84 9361.2 dated May 11, 2017.
International Preliminary Report of corresponding PCT Application No. PCT/JP2014/073289 dated Apr. 14, 2016.

* cited by examiner

AIR CONDITIONING SYSTEM AND METHOD FOR CONTROLLING SAME

CROSS-REFERENCE TO RELATED APPLICATIONS

This U.S. National stage application claims priority under 35 U.S.C. § 119(a) to Japanese Patent Application No. 2013-204146, filed in Japan on Sep. 30, 2013, the entire contents of which are hereby incorporated herein by reference.

TECHNICAL FIELD

The present invention relates to an air conditioning system for circulating refrigerant between a heat-source-side heat exchanger and a plurality of usage-side heat exchangers, and a method for controlling same.

BACKGROUND ART

In a conventional air conditioning apparatus or another air conditioning system, a vapor-compression refrigeration cycle is performed for circulating refrigerant in a refrigerant circuit having a compressor for compressing the refrigerant, a heat-source-side heat exchanger and usage-side heat exchanger for enabling the refrigerant to exchange heat, and a pressure-reducing mechanism for pressure-reducing the refrigerant. Among such air conditioning systems, there are those in which a plurality of indoor units including usage-side heat exchangers are disposed in the same large indoor space of, e.g., a conference hall or the like, in order to sufficiently condition the air in the same indoor space.

In an air conditioning system having a plurality of indoor units in this manner, e.g., the air conditioning apparatus disclosed in Japanese Laid-open Patent Application No. 2011-257126, operating efficiency is improved without causing the capabilities of the plurality of indoor units to be insufficient, by adjusting the operations of the outdoor unit and the plurality of indoor units.

SUMMARY

Technical Problem

However, because individual controls are performed on the plurality of indoor units individually, there are cases in which conditions arise such that, due to the operating state, among the plurality of indoor units there are both those that are thermo-ON and those that are thermo-OFF. In such cases, there are times when the operating efficiency of the system has a whole could still be improved even though the operating efficiencies of the individual indoor units is high.

An object of the present invention is for an air conditioning system in which a plurality of indoor units are disposed in the same indoor space to be made more efficient over the entire air conditioning system.

Solution to Problem

An air conditioning system according to a first aspect of the present invention comprises: a plurality of indoor units installed in the same indoor space, including respective usage-side heat exchangers, and capable of setting set temperatures individually; an outdoor unit including a heat-source-side heat exchanger for conducting heat exchange with refrigerant circulating through the usage-side heat exchangers; and a control device configured so as to use the set temperatures of the indoor units to calculate a representative temperature related value shared by the indoor units, and simultaneously switch the indoor units between thermo-ON and thermo-OFF on the basis of the representative temperature related value.

In the air conditioning system of the first aspect, because the indoor unit are simultaneously switched between thermo-ON and thermo-OFF on the basis of a shared representative temperature related value, it is possible to avoid instances where there are both thermo-ON indoor units and thermo-OFF indoor units. Because a shared representative temperature related value is used at this time, the efficiency of the entire air conditioning system can also be improved.

An air conditioning system according to a second aspect of the present invention is the air conditioning system according to the first aspect, wherein the control device appoint the operating condition of the outdoor unit so as to satisfy the highest increase requirement among the requirements to increase air-conditioning capability from the indoor units.

In the air conditioning system of the second aspect, the outdoor unit can be operated in response to the highest requirement of air-conditioning capability from among the indoor units, and efficiency of the entire air conditioning system can be improved while preventing deficiencies in air-conditioning capability in some indoor units.

An air conditioning system according to a third aspect of the present invention is the air conditioning system according to the second aspect, wherein the control device has required temperature calculation units for calculating a required evaporation temperature or a required condensation temperature of the usage-side heat exchanger for each of the indoor units, and a target value appointing unit for appointing a target evaporation temperature on the basis of the minimum value among the required evaporation temperatures of the indoor units calculated in the required temperature calculation units, or appointing a target condensation temperature on the basis of the maximum value among the required condensation temperatures of the indoor units calculated in the required temperature calculation units.

In the air conditioning system of the third aspect, a target evaporation temperature or a target condensation temperature can be appointed for the outdoor unit in response to the highest requirement of air-conditioning capability from among the indoor units, whereby the efficiency of the entire air conditioning system can be improved while preventing deficiencies in air-conditioning capability in some indoor units.

An air conditioning system according to a fourth aspect of the present invention is the air conditioning system according to any of the first through third aspects, wherein the control device uses a weighted average value as the representative temperature related value, the weighted average value being found from the differences between the respective control temperatures and set temperatures of the indoor units and being weighted in accordance with at least one of the degree of influence on the thermal environment of the indoor space and the degree of influence on the comfort of the occupants of the indoor space.

In the air conditioning system of the fourth aspect, the weighted average rather than merely the average is found from the differences between the control temperatures and set temperatures of the indoor units, whereby control can be performed that reflects the differences between each indoor unit in at least one of the degree of influence on the thermal environment of the indoor space and the degree of influence on the comfort of the occupants of the indoor space.

An air conditioning system according to a fifth aspect of the present invention is the air conditioning system according to the fourth aspect, wherein, in the control device, the weighted average value is weighted according to a rated capacity of each indoor unit.

In the air conditioning system of the fifth aspect, the rated capacities of the indoor units can be used to assign weighting in accordance with the degree of influence on the thermal environment of the indoor space, and the degree of influence that each indoor unit occasionally has on the indoor environment can be reflected.

An air conditioning system according to a sixth aspect of the present invention is the air conditioning system according to the fourth or fifth aspect, wherein, in the control device, the weighted average value is weighted according to an air-conditioning capability of each indoor unit.

In the air conditioning system of the sixth aspect, the air-conditioning capabilities of the indoor units can be used to assign weighting in accordance with the degree of influence on the thermal environment of the indoor space, whereby emphasis can be placed on the difference between the control temperature and set temperature of the indoor unit outputting the highest air-conditioning capability, and the degree of influence that each indoor unit occasionally has on the indoor environment can be reflected.

An air conditioning system according to a seventh aspect of the present invention is the air conditioning system according to any of the fourth through sixth aspects, wherein, in the control device, the weighted average value is weighted according to an airflow volume of each indoor unit.

In the air conditioning system of the seventh aspect, the airflow volumes of the indoor units can be used to assign weighting in accordance with the degree of influence on the thermal environment of the indoor space, whereby emphasis can be placed on the difference between the control temperature and set temperature of the indoor unit that has the greatest airflow volume, and the degree of influence that each indoor unit occasionally has on the indoor environment can be reflected.

An air conditioning system according to an eighth aspect of the present invention is the air conditioning system according to any of the fourth through seventh aspects, wherein, in the control device, the weighted average value is weighted according to an occupant density in the area surrounding each indoor unit.

In the air conditioning system of the eighth aspect, the occupant densities in the areas surrounding the indoor units are used to assign weighting in accordance with the degree of influence on the comfort of the occupants, whereby weighting can be given to the difference between the control temperatures and the set temperatures of indoor units having high occupant densities, and it is easy to provide and environment that more people will find comfortable.

An air conditioning system according to a ninth aspect of the present invention is the air conditioning system according to any of the fourth through eighth aspects, wherein, in the control device, the weighted average value is weighted in accordance with a weighting set value of each indoor unit.

In the air conditioning system of the ninth aspect, the weighting set values of the indoor units are used to assign weighting in accordance with the degree of influence on the comfort of the occupants, whereby weighting can be given to the difference between the control temperatures and the set temperatures of indoor units having high weighting set values, the weighting set values make it easy to provide an environment corresponding to the separate circumstances of the occupants, and it is easy to improve the comfort of the occupants.

An air conditioning system according to a tenth aspect of the present invention is the air conditioning system according to any of the first through ninth aspects, wherein the indoor units further include respective air blowers of which the airflow volumes directed to the usage-side heat exchangers can be adjusted; and the control device adjusts the air blowers for each indoor unit, reduce the airflow volumes when the air-conditioning capabilities are excessive, and increase the airflow volumes when the air-conditioning capabilities are insufficient.

In the air conditioning system of the tenth aspect, the air-conditioning capability of each indoor unit can be autonomously adjusted to optimize capability via the airflow volume of the air blower, and instances of efficiency loss due to changes in thermo-ON conditions can be suppressed.

An air conditioning system according to an eleventh aspect of the present invention is the air conditioning system according to any of the first through tenth aspects, wherein the indoor units further include respective expansion mechanisms capable of adjusting the degrees of superheat or the degrees of subcooling in the outlet sides of the usage-side heat exchangers, and the control device adjusts the opening degrees of the expansion mechanisms in each indoor unit, reduce the degrees of superheat or degrees of subcooling when the air-conditioning capabilities are excessive, and increase the degrees of superheat or degrees of subcooling when the air-conditioning capabilities are insufficient.

In the air conditioning system of the eleventh aspect, the opening degree of the expansion mechanism in each indoor unit can be autonomously adjusted to optimize capability in each indoor unit, and instances of efficiency loss due to changes in thermo-ON conditions can be suppressed.

An air conditioning system according to a twelfth aspect of the present invention is the air conditioning system according to any of the first through eleventh aspects, wherein the control device is centralized controllers which acquire data from the outdoor unit and the indoor units, and send data to the outdoor unit and the indoor units.

In the air conditioning system of the twelfth aspect, the outdoor unit and the indoor units can be collectively managed by centralized controllers, and the entire air conditioning system is easily harmonized.

A method for controlling an air conditioning system according to a thirteenth aspect of the present invention is a method for controlling an air conditioning system comprising: a plurality of indoor units installed in the same indoor space, including respective usage-side heat exchangers, and capable of setting set temperatures individually; and an outdoor unit including a heat-source-side heat exchanger for conducting heat exchange with refrigerant circulating through the usage-side heat exchangers, the air conditioning system being configured so that a representative temperature related value shared by the indoor units is calculated using the set temperatures of the indoor units, and the indoor units are simultaneously switched between thermo-ON and thermo-OFF on the basis of the representative temperature related value.

In the method for controlling an air conditioning system of the thirteenth aspect, because the air conditioning system is configured so that the indoor units are simultaneously switched between thermo-ON and thermo-OFF on the basis of a shared representative temperature related value, instances of both thermo-ON indoor units and thermo-OFF indoor units can be avoided. Because a shared representative temperature related value is used at this time, the efficiency of the entire air conditioning system can also be improved.

Advantageous Effects of Invention

In the air conditioning system according to the first aspect of the present invention or the method for controlling an air conditioning system according to the thirteenth aspect, the overall efficiency can be improved in an air conditioning system in which a plurality of indoor units are disposed in the same indoor space.

In the air conditioning system of the second aspect, the overall efficiency of the air conditioning system can be improved while sufficient air-conditioning capability is maintained.

In the air conditioning system of the third aspect, the overall efficiency of the air conditioning system can be improved while sufficient air-conditioning capability is maintained by the appointment of a target evaporation temperature or a target condensation temperature in the target value appointing unit.

In the air conditioning system of the fourth aspect, the overall efficiency of the air conditioning system can be improved while reflecting the differences between each indoor unit in at least one of the degree of influence on the thermal environment and the degree of influence on the comfort of the occupants.

In the air conditioning system of the fifth aspect, the overall efficiency of the air conditioning system can be improved while reflecting the difference in the degree of influence of each indoor unit on the thermal environment, using the rated capacities of the indoor units.

In the air conditioning system of the sixth aspect, the overall efficiency of the air conditioning system can be improved while reflecting the difference in the degree of influence of each indoor unit on the thermal environment, using the air-conditioning capabilities of the indoor units.

In the air conditioning system of the seventh aspect, the overall efficiency of the air conditioning system can be improved while reflecting the difference in the degree of influence of each indoor unit on the thermal environment, using the airflow volumes of the indoor units.

In the air conditioning system of the eighth aspect, the overall efficiency of the air conditioning system can be improved while using the occupant densities of the surrounding areas of the indoor units to provide an environment that more people will find comfortable.

In the air conditioning system of the ninth aspect, the overall efficiency of the air conditioning system can be improved while using the weighting set values of the indoor units to provide an environment corresponding to the separate circumstances of the occupants.

In the air conditioning system of the tenth aspect, the overall efficiency of the air conditioning system can be improved while autonomously suppressing efficiency loss due to changes in thermo-ON conditions, via the airflow volume of the air blower in each indoor unit.

In the air conditioning system of the eleventh aspect, the overall efficiency of the air conditioning system can be improved while autonomously suppressing efficiency loss due to changes in thermo-ON conditions, via the opening degree of the expansion mechanism in each indoor unit.

In the air conditioning system of the twelfth aspect, the overall efficiency of the air conditioning system can be improved while the entire air conditioning system is harmonized by centralized controllers.

DESCRIPTION OF EMBODIMENTS

An air conditioning apparatus and a method for controlling same are described below, with reference to the drawings, as an example of the air conditioning system and the method for controlling same according to the present invention.

(1) Configuration of Air Conditioning Apparatus

Figure 1:
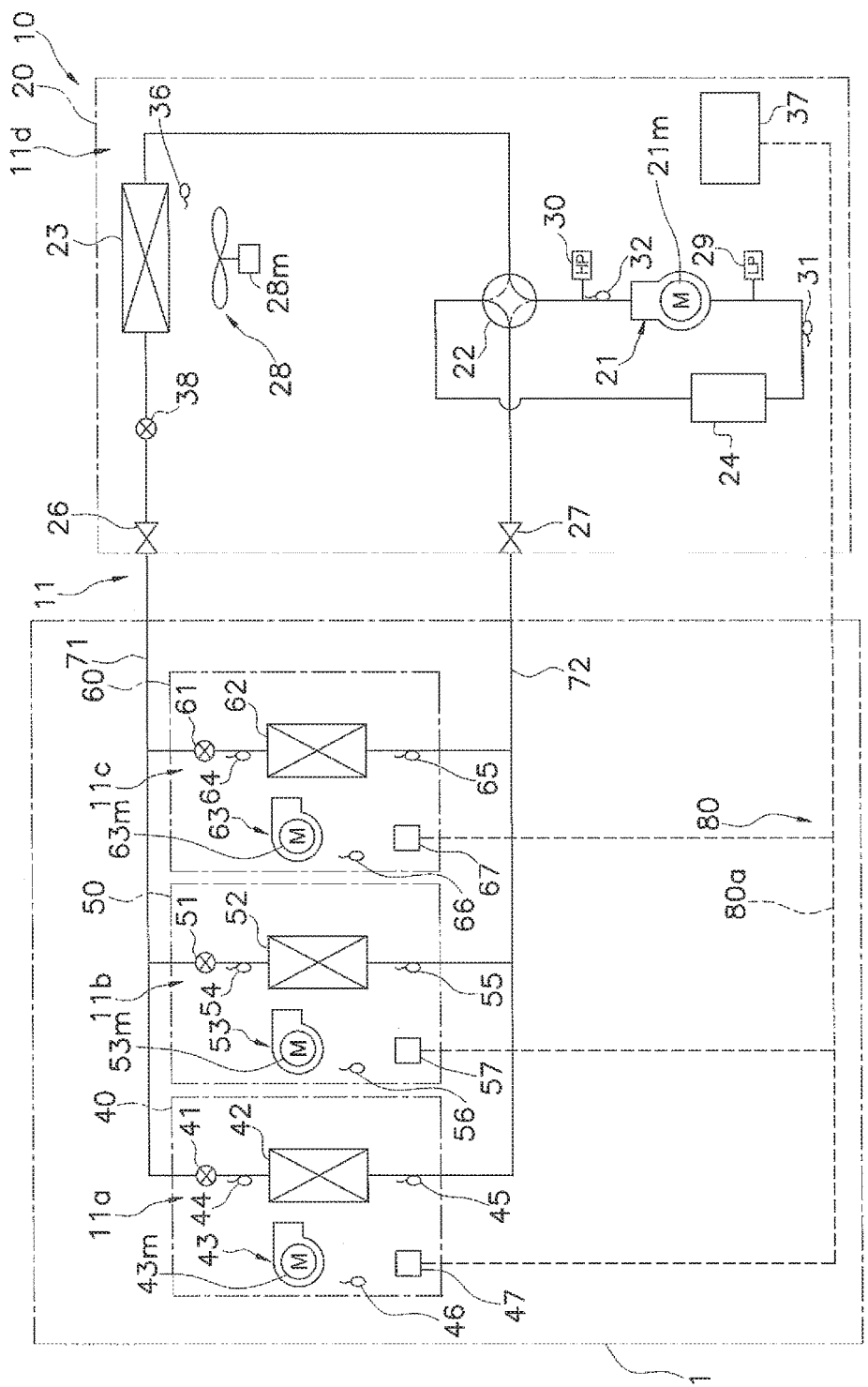
FIG. 1 is a circuit diagram showing the schematic configuration of an air conditioning apparatus according to an embodiment of the present invention.

FIG. 1 is a schematic configuration drawing of an air conditioning apparatus according to an embodiment of the present invention. The air conditioning apparatus 10 is an apparatus used to cool and warm the air in a room of a building or the like, by performing a vapor-compression refrigeration cycle operation. The air conditioning apparatus 10 comprises primarily an outdoor unit 20 as one heat source unit, indoor units 40, 50, 60 as a plurality of usage units (three in the present embodiment) connected in parallel to the outdoor unit, and a liquid refrigerant communication tube 71 and gas refrigerant communication tube 72 as refrigerant communication tubes for connecting the outdoor unit 20 and the indoor units 40, 50, 60. Specifically, a vapor-compression refrigerant circuit 11 of the air conditioning apparatus 10 of the present embodiment is configured by connecting the outdoor unit 20, the indoor units 40, 50, 60, the liquid refrigerant communication tube 71, and the gas refrigerant communication tube 72.

(1-1) Indoor Units

The indoor units 40, 50, 60 are installed in one room 1 such as, e.g., a conference room of a building by being embedded in, suspended from, or otherwise attached to the ceiling of the room, or by being mounted on or otherwise attached to a wall of the room. The indoor units 40, 50, 60 are connected to the outdoor unit 20 via the liquid refrigerant communication tube 71 and the gas refrigerant communication tube 72, and the indoor units constitute part of the refrigerant circuit 11.

Next, the configurations of the indoor units 40, 50, 60 are described. Because the indoor unit 40 and the indoor units 50, 60 have the same configuration, only the configuration of the indoor unit 40 is described here, and the configurations of the indoor units 50, 60, being denoted with symbols numbering in the fifties and sixties in place of the symbols numbering in the forties indicating the components of the indoor unit 40, are not described.

The indoor unit 40 has primarily an indoor-side refrigerant circuit 11a constituting part of the refrigerant circuit 11

(the indoor unit 50 has an indoor-side refrigerant circuit 11*b* and the indoor unit 60 has an indoor-side refrigerant circuit 11*c*). This indoor-side refrigerant circuit 11*a* has primarily an indoor expansion valve 41 as an expansion mechanism and an indoor heat exchanger 42 as a usage-side heat exchanger. In the present embodiment, indoor expansion valves 41, 51, 61 are provided as expansion mechanisms to the indoor units 40, 50, 60 respectively, but the embodiment is not limited as such, and an expansion mechanism (including an expansion valve) may be provided to the outdoor unit 20, or to a connection unit independent of the indoor units 40, 50, 60 and the outdoor unit 20.

The indoor expansion valve 41 is an electric expansion valve connected to the liquid side of the indoor heat exchanger 42 in order to adjust or otherwise manipulate the flow rate of refrigerant flowing within the indoor-side refrigerant circuit 11*a*, and is also capable of blocking the passage of refrigerant.

The indoor heat exchanger 42 is a cross-fin-type fin-and-tube heat exchanger configured from, e.g., a heat transfer tube and numerous fins, and this heat exchanger functions as an evaporator of refrigerant to cool indoor air during an air-cooling operation, and functions as a condenser of refrigerant to heat indoor air during an air-heating operation.

The indoor unit 40 has an indoor fan 43 as an air blower for drawing indoor air into the unit, and supplying heat-exchanged indoor air as supply air into the room after the air has exchanged heat with refrigerant in the indoor heat exchanger 42. The indoor fan 43 is a fan capable of varying the airflow volume of air supplied to the indoor heat exchanger 42 within a predetermined airflow volume range, and is a centrifugal fan, multi-blade fan, or the like driven by a motor 43*m* composed of, e.g., a DC fan motor or the like. The indoor fan 43 can be selectively set to any of the following modes: constant-airflow-volume mode in which the airflow volume is set to one of three constant airflow volumes including low airflow having the lowest airflow volume, high airflow having the highest airflow volume, and medium airflow of an intermediate extent between low airflow and high airflow; automatic-airflow-volume-control mode in which the airflow volume is automatically varied from low airflow to high airflow in accordance with the degree of superheat SH, the degree of subcooling SC, and/or other factors; and airflow-volume-setting mode in which the airflow volume is manually varied through a remote controller or another input device. Specifically, when a user selects either "low airflow," "medium airflow," or "high airflow" using, e.g., a remote controller, the mode will be constant-airflow-volume mode in which the airflow volume is constant at low airflow, and when a user selects "automatic," the mode will be automatic-airflow-volume-control mode in which the airflow volume is varied automatically in accordance with the operating state. A description is given here of the configuration whereby the fan tap of the airflow volume of the indoor fan 43 is switched among the three levels "low airflow," "medium airflow," and "high airflow." The indoor fan airflow volume Ga, which is the airflow volume of the indoor fan 43, can be derived from a calculation using, e.g., the rotational speed of the motor 43*m* as a parameter. Alternative methods include deriving the indoor fan airflow volume Ga from a calculation based on the electric current value of the motor 43*m*, deriving the indoor fan airflow volume Ga from a calculation based on the set fan tap, and other methods.

Various sensors are also provided to the indoor unit 40. On the liquid side of the indoor heat exchanger 42, a liquid line temperature sensor 44 is provided for detecting the temperature of the refrigerant (i.e., the refrigerant temperature corresponding to the condensation temperature Tc during the air-heating operation or the evaporation temperature Te during the air-cooling operation). On the gas side of the indoor heat exchanger 42, a gas line temperature sensor 45 is provided for detecting the temperature of the refrigerant. On the intake port side for indoor air of the indoor unit 40, an indoor temperature sensor 46 is provided for detecting the temperature of indoor air flowing into the unit (i.e., the indoor temperature Tr). For example, thermistors can be used for the liquid line temperature sensor 44, the gas line temperature sensor 45, and the indoor temperature sensor 46. The indoor unit 40 also has an indoor-side control device 47 for controlling the actions of the components constituting the indoor unit 40. The indoor-side control device 47 has an air-conditioning capability calculation unit 47*a* for calculating the current air-conditioning capability and other parameters in the indoor unit 40, and a required temperature calculation unit 47*b* for calculating, on the basis of the current air-conditioning capability, the required evaporation temperature Ter or required condensation temperature Tcr needed to achieve said capability (see FIG. 2). The indoor-side control device 47, which has a microcomputer (not shown), a memory 47*c*, and or the like provided in order to control the indoor unit 40, is designed to be capable of exchanging control signals and the like with a remote controller (not shown) for individually operating the indoor unit 40, and exchanging control signals and the like with the outdoor unit 20 via a transmission line 80*a*.

(1-2) Outdoor Unit

The outdoor unit 20 is installed on the outside of a building or the like and is connected to the indoor units 40, 50, 60 via the liquid refrigerant communication tube 71 and the gas refrigerant communication tube 72, and the outdoor unit 20 together with the indoor units 40, 50, 60 constitutes the refrigerant circuit 11.

Next, the configuration of the outdoor unit 20 is described. The outdoor unit 20 has primarily an outdoor-side refrigerant circuit 11*d* constituting part of the refrigerant circuit 11. This outdoor-side refrigerant circuit 11*d* has primarily a compressor 21, a four-way switching valve 22, an outdoor heat exchanger 23 as a heat-source-side heat exchanger, an outdoor expansion valve 38 as an expansion mechanism, an accumulator 24, a liquid-side shutoff valve 26, and a gas-side shutoff valve 27.

The compressor 21 is a compressor of which the operating capacity can be varied, and is a positive-displacement compressor driven by a motor 21*m* of which the rotational speed is controlled by an inverter. There is only one compressor 21 of the outdoor unit 20 depicted here, but there can be two or more compressors in cases such as when there is a large number of indoor units connected.

The four-way switching valve 22 is a valve for switching the direction of refrigerant flow. During the air-cooling operation, the four-way switching valve 22 connects the discharge side of the compressor 21 and the gas side of the outdoor heat exchanger 23, and connects the intake side of the compressor 21 (specifically, the accumulator 24) and the gas refrigerant communication tube 72 side (air-cooling operation state: refer to the solid lines of the four-way switching valve 22 in FIG. 1), in order to make the outdoor heat exchanger 23 function as a condenser of the refrigerant compressed by the compressor 21 and the indoor heat exchangers 42, 52, 62 function as evaporators of the refrigerant condensed in the outdoor heat exchanger 23. During the air-heating operation, the four-way switching valve 22 can connect the discharge side of the compressor 21 and the gas refrigerant communication tube 72 side, and connects the intake side of the compressor 21 and the gas side of the outdoor heat exchanger 23 (air-heating operation state: refer to the dashed lines of the four-way switching valve 22 in FIG. 1), in order to make the indoor heat exchangers 42, 52, 62 function as condensers of the refrigerant compressed by the compressor 21 and the outdoor heat exchanger 23 function as an evaporator of the refrigerant condensed in the indoor heat exchangers 42, 52, 62.

The outdoor heat exchanger 23 is, e.g., a cross-fin-type fin-and-tube heat exchanger, and is a device for enabling heat exchange between air and refrigerant in order to use air as a heat source. The outdoor heat exchanger 23 is a heat exchanger that functions as a condenser of refrigerant during the air-cooling operation, and functions as an evaporator of refrigerant during the air-heating operation. The gas side of the outdoor heat exchanger 23 is connected to the four-way switching valve 22, and the liquid side is connected to the outdoor expansion valve 38.

The outdoor expansion valve 38 is an electric expansion valve disposed on what is during the air-cooling operation the downstream side of the outdoor heat exchanger 23 in the direction of refrigerant flow in the refrigerant circuit 11, in order to adjust the pressure, flow rate, and/or other characteristics of the refrigerant flowing within the outdoor-side refrigerant circuit 11d. In other words, the outdoor expansion valve 38 is connected to the liquid side of the outdoor heat exchanger 23.

The outdoor unit 20 has an outdoor fan 28 as an air blower for drawing outdoor air into the unit, and discharging the air out of the room after the air has exchanged heat with the refrigerant in the outdoor heat exchanger 23. This outdoor fan 28 is a fan capable of varying the airflow volume of air supplied to the outdoor heat exchanger 23, and is a propeller fan or the like driven by a motor 28m composed of, e.g., a DC fan motor or the like.

The liquid-side shutoff valve 26 and the gas-side shutoff valve 27 are valves provided to the ports connecting with the liquid refrigerant communication tube 71 and the gas refrigerant communication tube 72. The liquid-side shutoff valve 26 is disposed on what is during the air-cooling operation the downstream side of the outdoor expansion valve 38 and the upstream side of the liquid refrigerant communication tube 71 in the direction of refrigerant flow in the refrigerant circuit 11, and is capable of blocking the passage of refrigerant. The gas-side shutoff valve 27 is connected to the four-way switching valve 22 and is capable of blocking the passage of refrigerant.

The outdoor unit 20 is provided with an intake pressure sensor 29 for detecting the intake pressure of the compressor 21 (i.e., the refrigerant pressure corresponding to the evaporation pressure Pe during the air-cooling operation), a discharge pressure sensor 30 for detecting the discharge pressure of the compressor 21 (i.e., the refrigerant pressure corresponding to the condensation pressure Pc during the air-heating operation), an intake temperature sensor 31 for detecting the intake temperature of the compressor 21, and a discharge temperature sensor 32 for detecting the discharge temperature of the compressor 21. Provided on the intake port side for outdoor air of the outdoor unit 20 is an outdoor temperature sensor 36 for detecting the temperature of outdoor air (i.e., the outdoor temperature) flowing into the unit. For example, thermistors can be used for the intake temperature sensor 31, the discharge temperature sensor 32, and the outdoor temperature sensor 36. The outdoor unit 20 also has an outdoor-side control device 37 for controlling the actions of the components constituting the outdoor unit 20.

Figure 2:
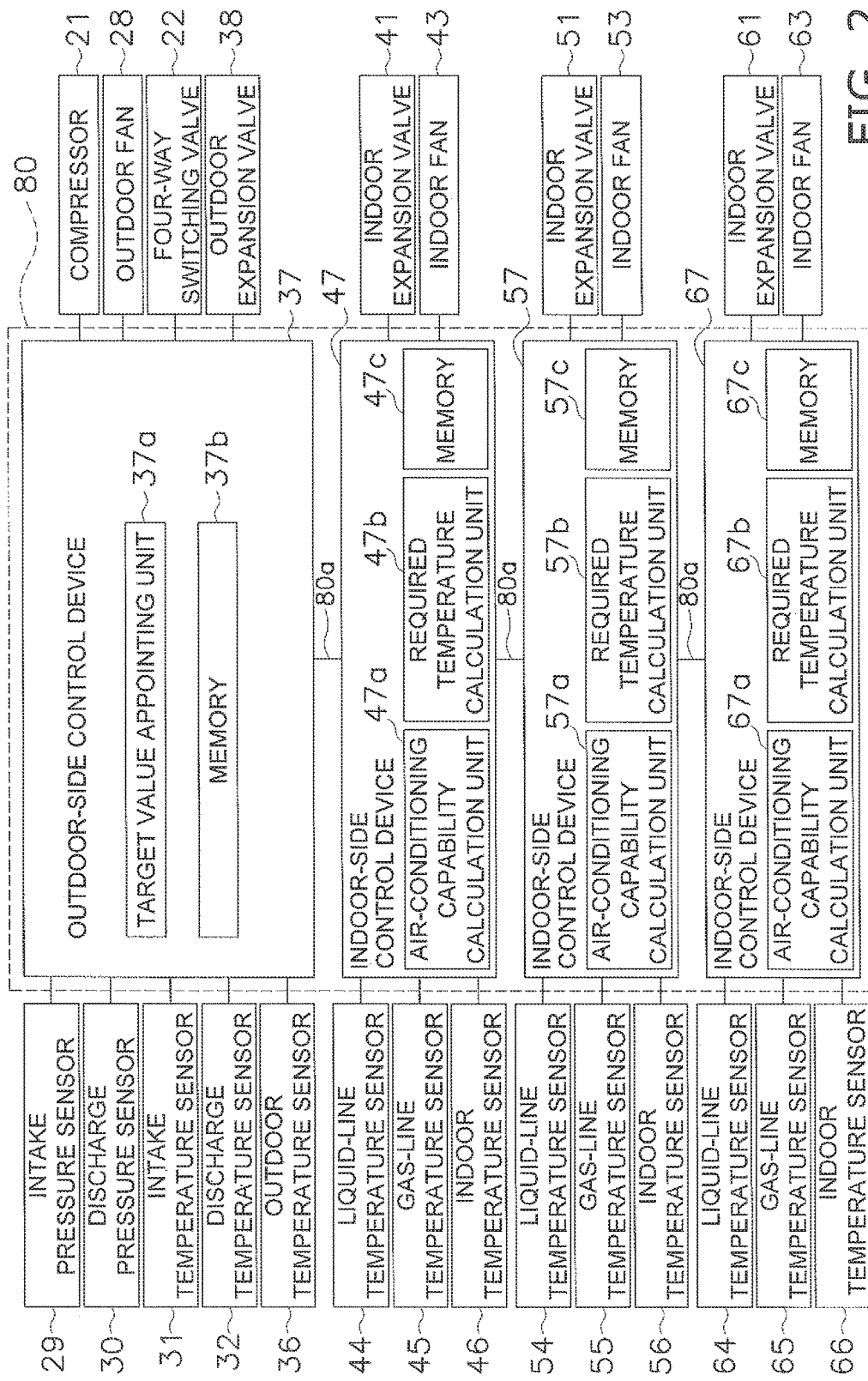
FIG. 2 is a block diagram for illustrating the control system of the air conditioning apparatus.

The outdoor-side control device 37 has a target value appointing unit 37a for appointing a target evaporation temperature Tet or a target condensation temperature Tct (alternatively, a target evaporation temperature difference ΔTet or a target condensation temperature difference ΔTct) for controlling the operating capacity of the compressor 21, as shown in FIG. 2. The outdoor-side control device 37 also has a microcomputer (not shown) provided in order to control the outdoor unit 20, a memory 37b, an inverter circuit for controlling the motor 21m, and/or the like, and the outdoor-side control device 37 is designed to be able to exchange control signals and the like with the indoor-side control devices 47, 57, 67 of the indoor units 40, 50, 60 via the transmission line 80a. Specifically, an operation control device 80 for performing operation control on the entire air conditioning apparatus 10 is configured from the indoor-side control devices 47, 57, 67, the outdoor-side control device 37, and the transmission line 80a connecting the control devices.

The operation control device 80 is connected so as to be able to receive the detection signals of the intake pressure sensor 29, the discharge pressure sensor 30, the intake temperature sensor 31, the discharge temperature sensor 32, the outdoor temperature sensor 36, the liquid line temperature sensors 44, 54, 64, the gas line temperature sensors 45, 55, 65, and the indoor temperature sensors 46, 56, 66, as shown in FIG. 2. The operation control device 80 is also connected to the compressor 21, the four-way switching valve 22, the outdoor fan 28, the outdoor expansion valve 38, the indoor expansion valves 41, 51, 61, the indoor fans 43, 53, 63, and other components so as to be able to control the outdoor unit 20 and the indoor units 40, 50, 60 on the basis of these detection signals and other factors. Furthermore, various data for controlling the air conditioning apparatus 10 is stored in the memories 37b, 47c, 57c, 67c constituting the operation control device 80.

(1-3) Refrigerant Communication Tube

The refrigerant communication tubes 71, 72 are refrigerant tubes constructed on site when the air conditioning apparatus 10 is installed in a building or another installation location, and tubes of various lengths and/or diameters are used depending on the installation location, the combination of the models of the outdoor unit and indoor units, and other installation conditions. For example, when a new air conditioning apparatus 10 is installed in a building or the like, the air conditioning apparatus 10 is filled with the proper quantity of refrigerant depending on the lengths and diameters of the refrigerant communication tubes 71, 72, and/or other installation conditions.

As described above, the indoor-side refrigerant circuits 11a, 11b, 11c, the outdoor-side refrigerant circuit 11d, and the refrigerant communication tubes 71, 72 are connected, constituting the refrigerant circuit 11 of the air conditioning apparatus 10. The air conditioning apparatus 10 is designed so that operation is performed by the operation control device 80 configured from the indoor-side control devices 47, 57, 67 and the outdoor-side control device 37, while the air-cooling operation and the air-heating operation are switched by the four-way switching valve 22, and the various devices of the outdoor unit 20 and the indoor units 40, 50, 60 are controlled in accordance with operating loads of the indoor units 40, 50, 60.

(2) Actions of Air Conditioning Apparatus

During the air-cooling operation and the air-heating operation in the air conditioning apparatus 10, indoor temperature control is performed on the indoor units 40, 50, 60, in which the indoor temperatures Tr1, Tr2, Tr3 are brought nearer to set temperatures Ts1, Ts2, Ts3 set individually for each of the indoor units 40, 50, 60 by a user via a remote controller or another input device. In this indoor temperature control, when the indoor fans 43, 53, 63 are set to automatic-airflow-volume-control mode, the airflow volume of the indoor fan 43 and the opening degree of the indoor expansion valve 41 are adjusted so that the indoor temperature Tr1 approaches the set temperature Ts1, the airflow volume of the indoor fan 53 and the opening degree of the indoor expansion valve 51 are adjusted so that the indoor temperature Tr2 approaches the set temperature Ts2, and the airflow volume of the indoor fan 63 and the opening degree of the indoor expansion valve 61 are adjusted so that the indoor temperature Tr3 converges on the set temperature Ts3.

When the indoor fans 43, 53, 63 are set to constant-airflow-volume mode, the opening degree of the indoor expansion valve 41 is adjusted so that the indoor temperature Tr1 approaches the set temperature Ts1, the opening degree of the indoor expansion valve 51 is adjusted so that the indoor temperature Tr2 approaches the set temperature Ts2, and the opening degree of the indoor expansion valve 61 is adjusted so that the indoor temperature Tr3 approaches the set temperature Ts3. What is controlled by adjusting the opening degrees of the indoor expansion valves 41, 51, 61 is the degree of superheat in the outlets of the indoor heat exchangers 42, 52, 62 during the air-cooling operation, and the degree of subcooling in the outlets of the indoor heat exchangers 42, 52, 62 during the air-heating operation.

(2-1) Air-Cooling Operation

First, the air-cooling operation is described using FIG. 1.

During the air-cooling operation, the four-way switching valve 22 is in the state indicated by the solid lines in FIG. 1, i.e., a state in which the discharge side of the compressor 21 is connected to the gas side of the outdoor heat exchanger 23, and the intake side of the compressor 21 is connected to the gas sides of the indoor heat exchangers 42, 52, 62 via the gas-side shutoff valve 27 and the gas refrigerant communication tube 72. The outdoor expansion valve 38 is fully open at this time. The liquid-side shutoff valve 26 and the gas-side shutoff valve 27 are open. The opening degree of the indoor expansion valve 41 is adjusted so that the degree of superheat SH1 of the refrigerant in the outlet of the indoor heat exchanger 42 (i.e., the gas side of the indoor heat exchanger 42) reaches a target degree of superheat SHt1, the opening degree of the indoor expansion valve 51 is adjusted so that the degree of superheat SH2 of the refrigerant in the outlet of the indoor heat exchanger 52 (i.e., the gas side of the indoor heat exchanger 52) is constant at a target degree of superheat SHt2, and the opening degree of the indoor expansion valve 61 is adjusted so that the degree of superheat SH3 of the refrigerant in the outlet of the indoor heat exchanger 62 (i.e., the gas side of the indoor heat exchanger 62) reaches a target degree of superheat SHt3.

The target degrees of superheat SHt1, SHt2, SHt3 are set to the optimal temperature values in order for the indoor temperatures Tr1, Tr2, Tr3 to approach the set temperatures Ts1, Ts2, Ts3 within a predetermined degree of superheat range. The degrees of superheat SH1, SH2, SH3 of the refrigerant in the outlets of the indoor heat exchangers 42, 52, 62 are respectively detected by subtracting the refrigerant temperature values (corresponding to the evaporation temperature Te) detected by the liquid line temperature sensors 44, 54, 64 from the refrigerant temperature values detected by the gas line temperature sensors 45, 55, 65. The degrees of superheat SH1, SH2, SH3 of the refrigerant in the outlets of the indoor heat exchangers 42, 52, 62 are not limited to being detected by the above method, and may be detected by converting the intake pressure of the compressor 21 detected by the intake pressure sensor 29 to a saturation temperature value corresponding to the evaporation temperature Te, and subtracting this refrigerant saturation temperature value from the refrigerant temperature values detected by the gas line temperature sensors 45, 55, 65.

Though not employed in the present embodiment, the degrees of superheat SH1, SH2, SH3 of the refrigerant in the outlets of the indoor heat exchangers 42, 52, 62 may be detected by providing temperature sensors for detecting the temperatures of the refrigerant flowing within the indoor heat exchangers 42, 52, 62, and subtracting the refrigerant temperature values corresponding to the evaporation temperatures Te detected by these temperature sensors from the refrigerant temperature values detected by the gas line temperature sensors 45, 55, 65.

When the compressor 21, the outdoor fan 28, and the indoor fans 43, 53, 63 are operated during this state of the refrigerant circuit 11, low-pressure gas refrigerant is drawn into the compressor 21 and compressed to high-pressure gas refrigerant. The high-pressure gas refrigerant is then sent to the outdoor heat exchanger 23 via the four-way switching valve 22, and the refrigerant exchanges heat with outdoor air supplied by the outdoor fan 28 and condenses to high-pressure liquid refrigerant. The high-pressure liquid refrigerant is sent to the indoor units 40, 50, 60 via the liquid-side shutoff valve 26 and the liquid refrigerant communication tube 71.

The high-pressure liquid refrigerant sent to the indoor units 40, 50, 60 is pressure-reduced nearly to the intake pressure of the compressor 21 by the indoor expansion valves 41, 51, 61, becoming low-pressure gas-liquid two-phase refrigerant which is sent to the indoor heat exchangers 42, 52, 62, and the refrigerant exchanges heat with indoor air in the indoor heat exchangers 42, 52, 62 and evaporates to low-pressure gas refrigerant.

This low-pressure gas refrigerant is sent to the outdoor unit 20 via the gas refrigerant communication tube 72, and the refrigerant flows through the gas-side shutoff valve 27 and the four-way switching valve 22 into the accumulator 24. The low-pressure gas refrigerant that has flowed into the accumulator 24 is again drawn into the compressor 21. An air-cooling operation can be performed in the air conditioning apparatus 10, in which the outdoor heat exchanger 23 is made to function as a condenser of the refrigerant compressed in the compressor 21, and the indoor heat exchangers 42, 52, 62 are made to function as evaporators of the refrigerant condensed in the outdoor heat exchanger 23 and then sent through the liquid refrigerant communication tube 71 and the indoor expansion valves 41, 51, 61. In the air conditioning apparatus 10, because the indoor units 40, 50, 60 have no mechanisms for adjusting the pressure of the refrigerant in the gas sides of the indoor heat exchangers 42, 52, 62, the indoor heat exchangers 42, 52, 62 all share a common evaporation pressure Pe.

Energy conservation control is performed during this air-cooling operation in the air conditioning apparatus 10. The energy conservation control during the air-cooling operation is described below on the basis of the flowchart of FIG. 3.

First, in step S11, the air-conditioning capability calculation units 47a, 57a, 67a of the indoor-side control devices 47, 57, 67 of the indoor units 40, 50, 60 respectively calculate the air-conditioning capabilities Q11, Q12, Q13 in the indoor units 40, 50, 60 on the basis of temperature differences ΔTer1, ΔTer2, ΔTer3 which are the temperature differences between the indoor temperatures Tr1, Tr2, Tr3 and the evaporation temperature Te, indoor fan airflow volumes Ga1, Ga2, Ga3 caused by the indoor fans 43, 53, 63, and the degrees of superheat SH1, SH2, SH3, at that point in time. The calculated air-conditioning capabilities Q11, Q12, Q13 are stored respectively in the memories 47c, 57c, 67c of the indoor-side control devices 47, 57, 67. The air-conditioning capabilities Q11, Q12, Q13 may also be calculated using the evaporation temperature Te instead of the temperature differences ΔTer1, ΔTer2, ΔTer3.

In step S12, the air-conditioning capability calculation units 47a, 57a, 67a respectively calculate displacements ΔQ1, ΔQ2, ΔQ3 of the air-conditioning capabilities in the indoor space on the basis of the indoor temperatures Tr1, Tr2, Tr3 calculated respectively by the indoor temperature sensors 46, 56, 66, and the temperature differences ΔT1, ΔT2, ΔT3 with the set temperatures Ts1, Ts2, Ts3 set by a user through a remote controller or the like at the time. The air-conditioning capability calculation units 47a, 57a, 67a then respectively calculate required capabilities Q21, Q22, Q23 by adding the displacements to the air-conditioning capabilities Q11, Q12, Q13. The calculated required capabilities Q21, Q22, Q23 are respectively stored in the memories 47c, 57c, 67c of the indoor-side control devices 47, 57, 67.

Figure 3:
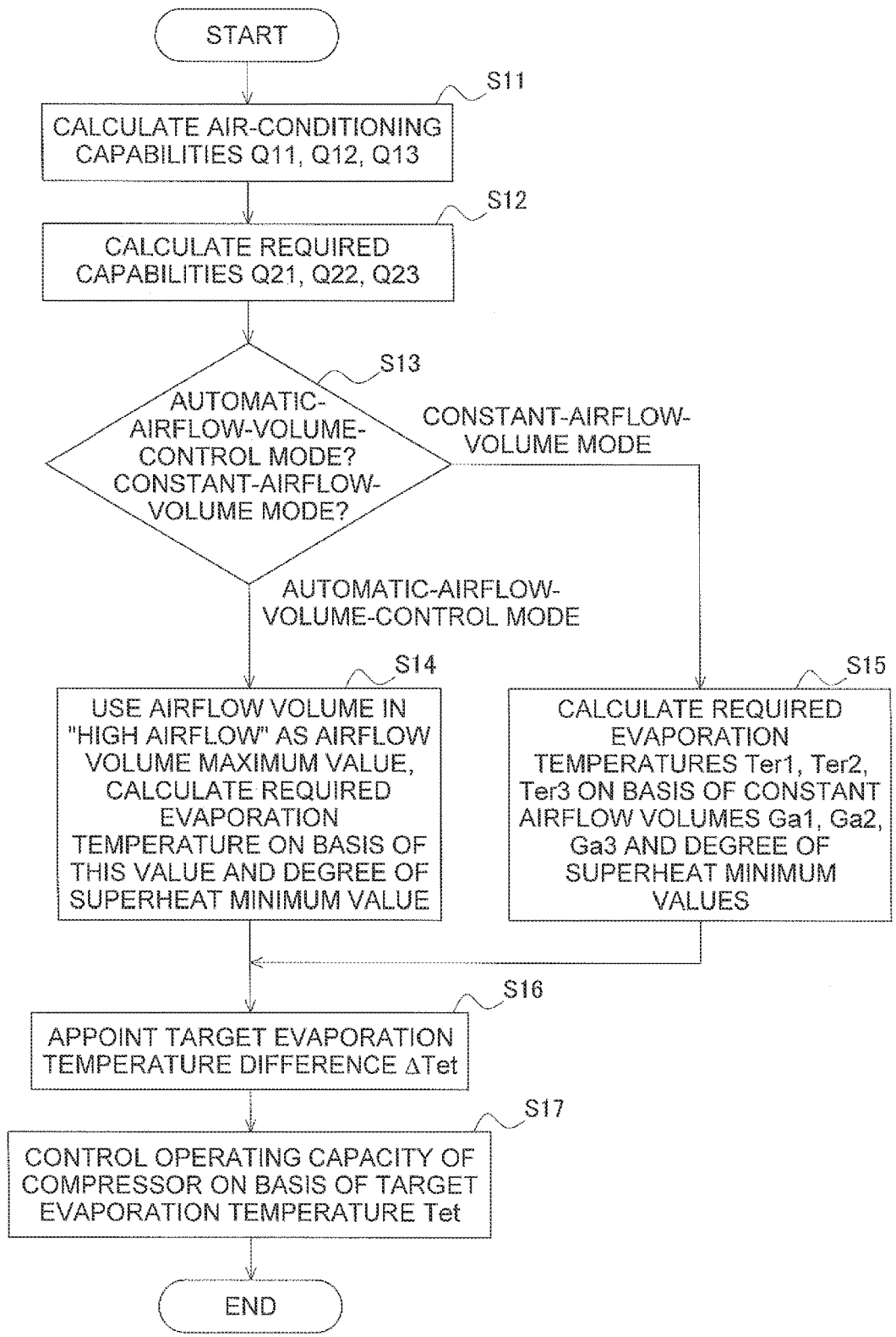
FIG. 3 is a flowchart showing the flow of energy conservation control in the air-cooling operation.

Though not shown in FIG. 3, when the indoor fans 43, 53, 63 are set to the automatic-airflow-volume-control mode in the indoor units 40, 50, 60 as described above, indoor temperature control is performed for adjusting the airflow volumes of the indoor fans 43, 53, 63 and the opening degrees of the indoor expansion valves 41, 51, 61 on the basis of the required capabilities Q21, Q22, Q23, so that the indoor temperatures Tr1, Tr2, Tr3 respectively approach the set temperatures Ts1, Ts2, Ts3. When the indoor fans 43, 53, 63 are set to the constant-airflow-volume mode, indoor temperature control is performed for adjusting the opening degrees of the indoor expansion valves 41, 51, 61 on the basis of the required capabilities Q21, Q22, Q23, so that the indoor temperatures Tr1, Tr2, Tr3 respectively approach the set temperatures Ts1, Ts2, Ts3.

Specifically, due to indoor temperature control, the air-conditioning capabilities of the indoor units 40, 50, 60 are maintained respectively between the above-described air-conditioning capabilities Q11, Q12, Q13 and the required capabilities Q21, Q22, Q23. Essentially, the equivalent of the amount of heat exchanged in the indoor heat exchangers 42, 52, 62 is between the air-conditioning capabilities Q11, Q12, Q13 of the indoor units 40, 50, 60 and the required capabilities Q21, Q22, Q23. Therefore, during energy conservation control when sufficient time has elapsed after the start of operation and a nearly steady state has been reached, the air-conditioning capabilities Q11, Q12, Q13 of the indoor units 40, 50, 60 and/or the required capabilities Q21, Q22, Q23 are nearly equivalent to the current amounts of heat exchanged in the indoor heat exchangers 42, 52, 62.

In step S13, a confirmation is made as to whether the airflow-volume set mode in the remote controllers of the indoor fans 43, 53, 63 is the automatic-airflow-volume-control mode or the constant-airflow-volume mode. When the airflow-volume set mode of the indoor fans 43, 53, 63 is the automatic-airflow-volume-control mode, the sequence transitions to step S14, and when the mode is the constant-airflow-volume mode, the sequence transitions to step S15.

In step S14, the required temperature calculation units 47b, 57b, 67b respectively calculate required evaporation temperatures Ter1, Ter2, Ter3 of the indoor units 40, 50, 60 on the basis of the required capabilities Q21, Q22, Q23, airflow volume maximum values $Ga_{MAX1}$, $Ga_{MAX2}$, $Ga_{MAX3}$ (the airflow volumes in "high airflow") of the indoor fans 43, 53, 63, and degree of superheat minimum values $SH_{min1}$, $SH_{min2}$, $SH_{min3}$. The required temperature calculation units 47b, 57b, 67b also respectively calculate evaporation temperature differences ΔTe1, ΔTe2, ΔTe3, which are the required evaporation temperatures Ter1, Ter2, Ter3 less the evaporation temperatures Te1, Te2, Te3 detected by the liquid line temperature sensors 44, 54, 64 at the time. The term "degree of superheat minimum value $SH_{min}$" used herein refers to the minimum value of the range in which the degree of superheat can be set by adjusting the opening degrees of the indoor expansion valves 41, 51, 61, the respective values $SH_{min1}$, $SH_{min2}$, $SH_{min3}$ are set according to the model, and the set values are sometimes different from each other and sometimes the same as each other. In the indoor units 40, 50, 60, when the airflow volumes of the indoor fans 43, 53, 63 and/or the degrees of superheat are brought to the airflow volume maximum values $Ga_{MAX1}$, $Ga_{MAX2}$, $Ga_{MAX3}$ and the degree of superheat minimum values $SH_{min1}$, $SH_{min2}$, $SH_{min3}$, if they are not currently at the airflow volume maximum values $Ga_{MAX1}$, $Ga_{MAX2}$, $Ga_{MAX3}$ and the degree of superheat minimum values $SH_{min1}$, $SH_{min2}$, $SH_{min3}$, it is possible to create a state in which greater amounts of heat exchanged than the current amounts are exhibited in the indoor heat exchangers 42, 52, 62. Therefore, an operating state amount involving the airflow volume maximum values $Ga_{MAX1}$, $Ga_{MAX2}$, $Ga_{MAX3}$ and the degree of superheat minimum values $SH_{min1}$, $SH_{min2}$, $SH_{min3}$ is an operating state amount that can create a state in which greater amounts of heat exchanged than the current amounts are exhibited in the indoor heat exchangers 42, 52, 62. The calculated evaporation temperature differences ΔTe1, ΔTe2, ΔTe3 are then stored respectively in the memories 47c, 57c, 67c of the indoor-side control devices 47, 57, 67.

In step S15, the required temperature calculation units 47b, 57b, 67b respectively calculate the required evaporation temperatures Ter1, Ter2, Ter3 of the indoor units 40, 50, 60 on the basis of the required capabilities Q21, Q22, Q23, the constant airflow volumes Ga1, Ga2, Ga3 (e.g., the airflow volumes in "medium airflow") of the indoor fans 43, 53, 63, and the degree of superheat minimum values $SH_{min1}$, $SH_{min2}$, $SH_{min3}$. The required temperature calculation units 47b, 57b, 67b also respectively calculate the evaporation temperature differences ΔTe1, ΔTe2, ΔTe3, which are the required evaporation temperatures Ter1, Ter2, Ter3 less the evaporation temperature Te detected by the liquid line temperature sensors 44, 54, 64 at the time. The calculated evaporation temperature differences ΔTe1, ΔTe2, ΔTe3 are stored respectively in the memories 47c, 57c, 67c of the indoor-side control devices 47, 57, 67. In this step S15, the constant airflow volumes Ga1, Ga2, Ga3 are employed instead of the airflow volume maximum values $Ga_{MAX1}$, $Ga_{MAX2}$, $Ga_{MAX3}$, but the purpose of this is to prioritize the airflow volumes set by the user, and the airflow volumes will be recognized as airflow volume maximum values within the range set by the user.

In step S16, the evaporation temperature differences ΔTe1, ΔTe2, ΔTe3, which had been stored respectively in the memories 47c, 57c, 67c of the indoor-side control devices 47, 57, 67 in steps S14 and S15, are sent to the outdoor-side control device 37 and stored in the memory 37b of the outdoor-side control device 37. The target value appointing unit 37a of the outdoor-side control device 37 then appoints a minimum evaporation temperature difference $\Delta Te_{min}$, which is the minimum among the evaporation temperature differences ΔTe1, ΔTe2, ΔTe3, as the target evaporation temperature difference ΔTet. For example, when the evaporation temperature differences ΔTe1, ΔTe2, ΔTe3 of the indoor units 40, 50, 60 are 1° C., 0° C., and −2° C., the ΔTe$_{min}$ is −2° C.

In step S17, the operating capacity of the compressor 21 is controlled so that the evaporation temperature nears the new target evaporation temperature Tet updated with the ΔTe$_{min}$. Thus, as a result of the operating capacity of the compressor 21 being controlled on the basis of the target evaporation temperature difference ΔTet, in the indoor unit (assume the indoor unit 40 in this case) that had calculated the minimum evaporation temperature difference ΔTe$_{min}$ employed as the target evaporation temperature difference ΔTet, the indoor fan 43 is adjusted so as to reach the airflow volume maximum value Ga$_{MAX1}$ when set to the automatic-airflow-volume-control mode, and the indoor expansion valve 41 is adjusted so that the degree of superheat SH in the outlet of the indoor heat exchanger 42 reaches the degree of superheat minimum value SH$_{min1}$.

Air-cooling heat exchange functions, which differ for each of the indoor units 40, 50, 60 and take into account the relationships of the air-conditioning (required) capabilities Q11, Q12, Q13 (Q21, Q22, Q23), airflow volumes Ga1, Ga2, Ga3, degrees of superheat SH1, SH2, SH3, and temperature differences ΔTer1, ΔTer2, ΔTer3 of each of the indoor units 40, 50, 60, are used to calculate the air-conditioning capabilities Q11, Q12, Q13 in step S11 and to calculate the evaporation temperature differences ΔTe1, ΔTe2, ΔTe3 in step S14 or S15. These air-cooling heat exchange functions are relational expressions associated with the air-conditioning (required) capabilities Q11, Q12, Q13 (Q21, Q22, Q23), airflow volumes Ga1, Ga2, Ga3, degrees of superheat SH1, SH2, SH3, and temperature differences ΔTer1, ΔTer2, ΔTer3 representing the characteristics of the indoor heat exchangers 42, 52, 62, and these functions are stored respectively in the memories 47c, 57c, 67c of the indoor-side control devices 47, 57, 67 of the indoor units 40, 50, 60. One variable among the air-conditioning (required) capabilities Q11, Q12, Q13 (Q21, Q22, Q23), airflow volumes Ga1, Ga2, Ga3, degrees of superheat SH1, SH2, SH3, and temperature differences ΔTer1, ΔTer2, ΔTer3 is determined by inputting the other three variables into the air-cooling heat exchange functions. The evaporation temperature differences ΔTe1, ΔTe2, ΔTe3 can thereby be brought to the proper values with precision, and the target evaporation temperature difference ΔTet can be accurately determined. Therefore, excessive increases of the evaporation temperature Te can be prevented. Therefore, excess and deficiency in the air-conditioning capabilities of the indoor units 40, 50, 60 can be prevented, the optimal states of the indoor units 40, 50, 60 can be achieved quickly and stably, and a greater energy conservation effect can be exhibited.

The target evaporation temperature Tet is updated on the basis of the target evaporation temperature difference ΔTet in this flow to control the operating capacity of the compressor 21, but the target evaporation temperature is not limited to the target evaporation temperature difference ΔTet, the target value appointing unit 37a may appoint the minimum value of the required evaporation temperature Ter calculated in the indoor units 40, 50, 60 as the target evaporation temperature Tet, and the operating capacity of the compressor 21 may be controlled on the basis of the appointed target evaporation temperature Tet.

(2-2) Air-Heating Operation

Next, the air-heating operation is described using FIG. 1. During the air-heating operation, the four-way switching valve 22 is in the state indicated by the dashed lines in FIG. 1 (the air-heating operation state), i.e., a state in which the discharge side of the compressor 21 is connected to the gas sides of the indoor heat exchangers 42, 52, 62 via the gas-side shutoff valve 27 and the gas refrigerant communication tube 72, and the intake side of the compressor 21 is connected to the gas side of the outdoor heat exchanger 23. The opening degree of the outdoor expansion valve 38 is adjusted in order to depressurize the refrigerant flowing into the outdoor heat exchanger 23 to a pressure at which the refrigerant can be evaporated (i.e., the evaporation pressure Pe) in the outdoor heat exchanger 23. The liquid-side shutoff valve 26 and the gas-side shutoff valve 27 are open. The opening degrees of the indoor expansion valves 41, 51, 61 are adjusted so that the degrees of subcooling SC1, SC2, SC3 of the refrigerant in the outlets of the indoor heat exchangers 42, 52, 62 respectively reach target degrees of subcooling SCt1, SCt2, SCt3. The target degrees of subcooling SCt1, SCt2, SCt3 are set to optimal temperature values in order for the indoor temperatures Tr1, Tr2, Tr3 to approach the set temperatures Ts1, Ts2, Ts3 within the degree of subcooling range specified according to the operating state at that time. The degrees of subcooling SC1, SC2, SC3 of the refrigerant in the outlets of the indoor heat exchangers 42, 52, 62 are detected by converting the discharge pressure Pd of the compressor 21 detected by the discharge pressure sensor 30 to a saturation temperature value corresponding to the condensation temperature Tc, and subtracting the refrigerant temperature values detected by the liquid line temperature sensors 44, 54, 64 from this refrigerant saturation temperature value.

Though not employed in the present embodiment, temperature sensors may be provided for detecting the temperature of the refrigerant flowing within the indoor heat exchangers 42, 52, 62, and the degrees of subcooling SC1, SC2, SC3 of the refrigerant in the outlets of the indoor heat exchangers 42, 52, 62 may be detected by subtracting the refrigerant temperature values corresponding to the condensation temperature Tc detected by these temperature sensors from the refrigerant temperature values detected by the liquid line temperature sensors 44, 54, 64.

When the compressor 21, the outdoor fan 28, and the indoor fans 43, 53, 63 are operated in this state of the refrigerant circuit 11, low-pressure gas refrigerant is drawn into the compressor 21 and compressed to high-pressure gas refrigerant, which is sent to the indoor units 40, 50, 60 via the four-way switching valve 22, the gas-side shutoff valve 27, and the gas refrigerant communication tube 72.

The high-pressure gas refrigerant sent to the indoor units 40, 50, 60 exchanges heat with indoor air in the indoor heat exchangers 42, 52, 62 and condenses to high-pressure liquid refrigerant, which then passes through the indoor expansion valves 41, 51, 61 to be pressure-reduced in accordance with the valve opening degrees of the indoor expansion valves 41, 51, 61.

The refrigerant that has passed through the indoor expansion valves 41, 51, 61 is sent to the outdoor unit 20 via the liquid refrigerant communication tube 71 and further pressure-reduced via the liquid-side shutoff valve 26 and the outdoor expansion valve 38, after which the refrigerant flows into the outdoor heat exchanger 23. The low-pressure gas-liquid two-phase refrigerant that has flowed into the outdoor heat exchanger 23 exchanges heat with outdoor air supplied by the outdoor fan 28 and evaporates to low-pressure gas refrigerant, which flows into the accumulator 24 via the four-way switching valve 22. The low-pressure gas refrigerant that has flowed into the accumulator 24 is again drawn into the compressor 21. Because the air conditioning apparatus 10 has no mechanisms for adjusting the pressure of the refrigerant in the gas sides of the indoor heat exchangers 42, 52, 62, the indoor heat exchangers 42, 52, 62 all share a common condensation pressure Pc.

Figure 4:
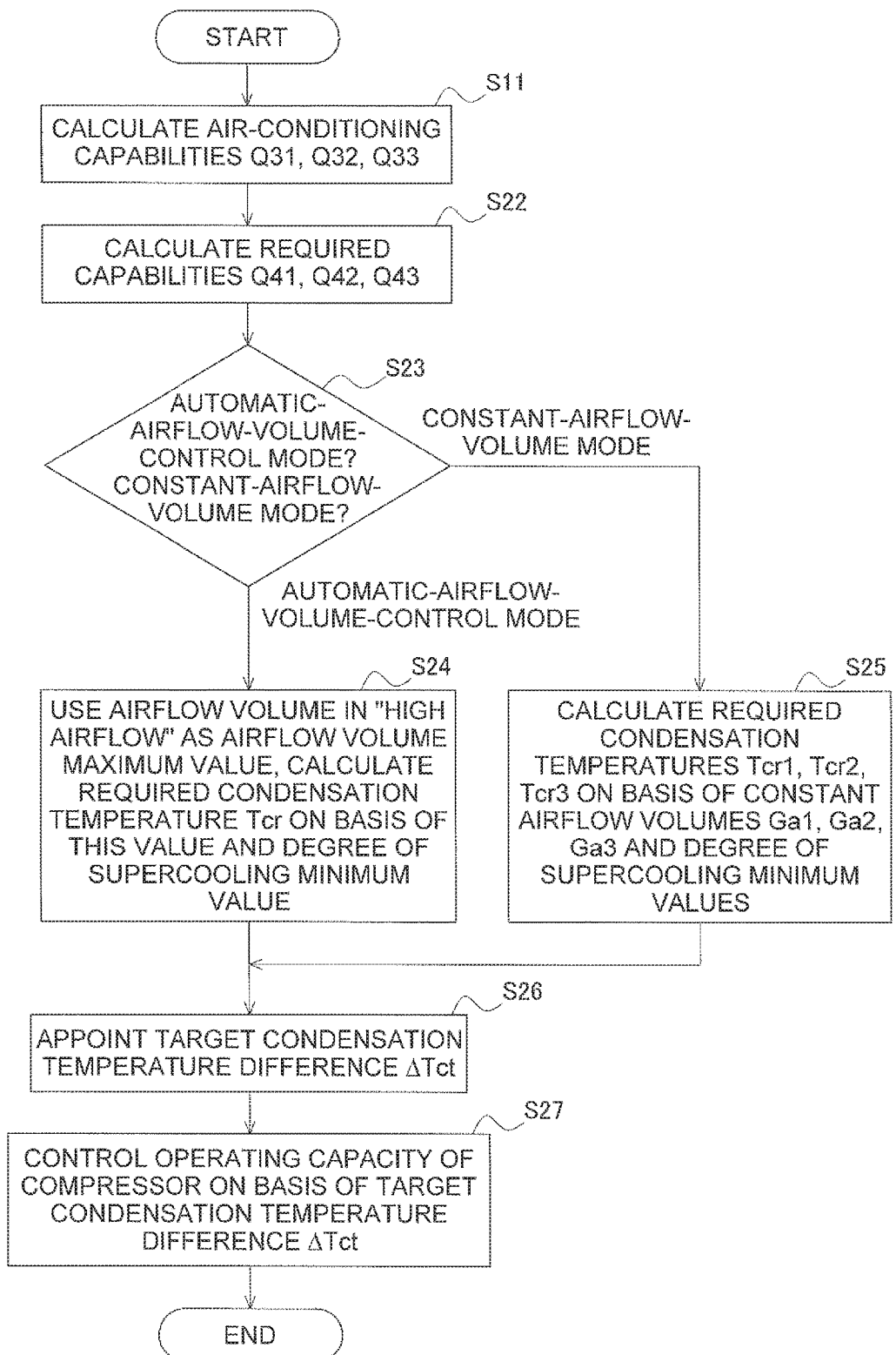
FIG. 4 is a flowchart showing the flow of energy conservation control in the air-heating operation.

Energy conservation control is performed during the air-heating operation in the air conditioning apparatus 10. The energy conservation control during the air-heating operation is described below on the basis of the flowchart of FIG. 4.

First, in step S21, the air-conditioning capability calculation units 47a, 57a, 67a of the indoor-side control devices 47, 57, 67 of the indoor units 40, 50, 60 respectively calculate the current air-conditioning capabilities Q31, Q32, Q33 in the indoor units 40, 50, 60 on the basis of temperature differences ΔTcr1, ΔTcr2, ΔTcr3 which are the temperature differences between the indoor temperatures Tr1, Tr2, Tr3 and the condensation temperature Tc, indoor fan airflow volumes Ga1, Ga2, Ga3 caused by the indoor fans 43, 53, 63, and the degrees of subcooling SC1, SC2, SC3, at that point in time. The calculated air-conditioning capabilities Q31, Q32, Q33 are stored respectively in the memories 47c, 57c, 67c of the indoor-side control devices 47, 57, 67. The air-conditioning capabilities Q31, Q32, Q33 may also be calculated using the condensation temperature Tc instead of the temperature differences ΔTcr1, ΔTcr2, ΔTcr3.

In step S22, the air-conditioning capability calculation units 47a, 57a, 67a respectively calculate displacements ΔQ1, ΔQ2, ΔQ3 of the air-conditioning capabilities in the indoor space on the basis of the indoor temperatures Tr1, Tr2, Tr3 detected respectively by the indoor temperature sensors 46, 56, 66, and the temperature differences ΔT1, ΔT2, ΔT3 with the set temperatures Ts1, Ts2, Ts3 set by a user through a remote controller or the like at the time. The air-conditioning capability calculation units 47a, 57a, 67a then respectively calculate required capabilities Q41, Q42, Q43 by adding the displacements to the air-conditioning capabilities Q31, Q32, Q33. The calculated required capabilities Q41, Q42, Q43 are respectively stored in the memories 47c, 57c, 67c of the indoor-side control devices 47, 57, 67. Though not shown in FIG. 4, when the indoor fans 43, 53, 63 are set to the automatic-airflow-volume-control mode in the indoor units 40, 50, 60 as described above, indoor temperature control is performed for adjusting the airflow volumes of the indoor fans 43, 53, 63 and the opening degrees of the indoor expansion valves 41, 51, 61 on the basis of the required capabilities Q41, Q42, Q43, so that the indoor temperatures Tr1, Tr2, Tr3 respectively approach the set temperatures Ts1, Ts2, Ts3. When the indoor fans 43, 53, 63 are set to the constant-airflow-volume mode, indoor temperature control is performed for adjusting the opening degrees of the indoor expansion valves 41, 51, 61 on the basis of the required capabilities Q41, Q42, Q43, so that the indoor temperatures Tr1, Tr2, Tr3 respectively approach the set temperatures Ts1, Ts2, Ts3.

Specifically, due to indoor temperature control, the air-conditioning capabilities of the indoor units 40, 50, 60 continue to be maintained respectively between the above-described air-conditioning capabilities Q31, Q32, Q33 and the required capabilities Q41, Q42, Q43. Essentially, the amount of heat exchanged in the indoor heat exchangers 42, 52, 62 is between the air-conditioning capabilities Q31, Q32, Q33 of the indoor units 40, 50, 60 and the required capabilities Q41, Q42, Q43. Therefore, during energy conservation control when sufficient time has elapsed after the start of operation and a nearly steady state has been reached, the air-conditioning capabilities Q31, Q32, Q33 of the indoor units 40, 50, 60 and/or the required capabilities Q41, Q42, Q43 are nearly equivalent to the current amounts of heat exchanged in the indoor heat exchangers 42, 52, 62.

In step S23, a confirmation is made as to whether the airflow-volume set mode in the remote controllers of the indoor fans 43, 53, 63 is the automatic-airflow-volume-control mode or the constant-airflow-volume mode. When the airflow-volume set mode of the indoor fans 43, 53, 63 is the automatic-airflow-volume-control mode, the sequence transitions to step S24, and when the mode is the constant-airflow-volume mode, the sequence transitions to step S25.

In step S24, the required temperature calculation units 47b, 57b, 67b respectively calculate required condensation temperatures Tcr1, Tcr2, Tcr3 of the indoor units 40, 50, 60 on the basis of the required capabilities Q41, Q42, Q43, the airflow volume maximum values $Ga_{MAX1}$, $Ga_{MAX2}$, $Ga_{MAX3}$ (the airflow volumes in "high airflow") of the indoor fans 43, 53, 63, and degree of subcooling minimum values $SC_{min1}$, $SC_{min2}$, $SC_{min3}$. The required temperature calculation units 47b, 57b, 67b also respectively calculate condensation temperature differences ΔTc1, ΔTc2, ΔTc3, which are the required condensation temperatures Tcr1, Tcr2, Tcr3 less the condensation temperatures Tc1, Tc2, Tc3 detected by the liquid line temperature sensors 44, 54, 64 at the time. The term "degree of subcooling minimum value $SC_{min}$" used herein refers to the minimum value of the range in which the degree of subcooling can be set by adjusting the opening degrees of the indoor expansion valves 41, 51, 61, and the respective values $SC_{min1}$, $SC_{min2}$, $SC_{min3}$ are set according to the model. In the indoor units 40, 50, 60, when the airflow volumes of the indoor fans 43, 53, 63 and/or the degrees of subcooling are brought to the airflow volume maximum values $Ga_{MAX1}$, $Ga_{MAX2}$, $Ga_{MAX3}$ and the degree of subcooling minimum values $SC_{min1}$, $SC_{min2}$, $SC_{min3}$, if they are not currently at the airflow volume maximum values $Ga_{MAX1}$, $Ga_{MAX2}$, $Ga_{MAX3}$ and the degree of subcooling minimum values $SC_{min1}$, $SC_{min2}$, $SC_{min3}$, it is possible to create a state in which greater amounts of heat exchanged than the current amounts are exhibited in the indoor heat exchangers 42, 52, 62. Therefore, an operating state amount involving the airflow volume maximum values $Ga_{MAX1}$, $Ga_{MAX2}$, $Ga_{MAX3}$ and the degree of subcooling minimum values $SC_{min1}$, $SC_{min2}$, $SC_{min3}$ is an operating state amount that can create a state in which greater amounts of heat exchanged than the current amounts are exhibited in the indoor heat exchangers 42, 52, 62. The calculated condensation temperature differences ΔTc1, ΔTc2, ΔTc3 are then stored respectively in the memories 47c, 57c, 67c of the indoor-side control devices 47, 57, 67.

In step S25, the required temperature calculation units 47b, 57b, 67b respectively calculate the required condensation temperatures Tcr1, Tcr2, Tcr3 of the indoor units 40, 50, 60 on the basis of the required capabilities Q41, Q42, Q43, the constant airflow volumes Ga1, Ga2, Ga3 (e.g., the airflow volumes in "medium airflow") of the indoor fans 43, 53, 63, and the degree of subcooling minimum values $SC_{min1}$, $SC_{min2}$, $SC_{min3}$. The required temperature calculation units 47b, 57b, 67b also respectively calculate the condensation temperature differences ΔTc1, ΔTc2, ΔTc3, which are the required condensation temperatures Tcr1, Tcr2, Tcr3 less the condensation temperatures Tc1, Tc2, Tc3 detected by the liquid line temperature sensors 44, 54, 64 at the time. The calculated condensation temperature differences ΔTc1, ΔTc2, ΔTc3 are stored respectively in the memories 47c, 57c, 67c of the indoor-side control devices 47, 57, 67. In this step S25, the constant airflow volumes Ga1, Ga2, Ga3 are employed instead of the airflow volume maximum values $Ga_{MAX1}$, $Ga_{MAX2}$, $Ga_{MAX3}$, but the purpose of this is to prioritize the airflow volumes set by the user, and the airflow volumes will be recognized as maximum values within the airflow volume range set by the user.

In step S26, the condensation temperature differences $\Delta Tc1$, $\Delta Tc2$, $\Delta Tc3$, which had been stored respectively in the memories $47c$, $57c$, $67c$ of the indoor-side control devices 47, 57, 67 in steps S24 and S25, are sent to the outdoor-side control device 37 and stored in the memory $37b$ of the outdoor-side control device 37. The target value appointing unit $37a$ of the outdoor-side control device 37 then appoints a maximum condensation temperature difference $\Delta Tc_{max}$, which is the maximum among the condensation temperature differences $\Delta Tc1$, $\Delta Tc2$, $\Delta Tc3$, as the target condensation temperature difference $\Delta Tct$. For example, when the condensation temperature differences $\Delta Tc1$, $\Delta Tc2$, $\Delta Tc3$ of the indoor units 40, 50, 60 are 1° C., 0° C., and −2° C., the $\Delta Tc_{max}$ is 1° C.

In step S27, the operating capacity of the compressor 21 is controlled on the basis of the target condensation temperature difference $\Delta Tct$. Thus, as a result of the operating capacity of the compressor 21 being controlled on the basis of the target condensation temperature difference $\Delta Tct$, in the indoor unit (assume the indoor unit 40 in this case) that had calculated the maximum condensation temperature difference $\Delta Tc_{max}$ employed as the target condensation temperature difference $\Delta Tct$, the indoor fan 43 is adjusted so as to reach the airflow volume maximum value $Ga_{MAX1}$ when set to the automatic-airflow-volume-control mode, and the indoor expansion valve 41 is adjusted so that the degree of subcooling SC in the outlet of the indoor heat exchanger 42 reaches the degree of subcooling minimum value $SC_{min1}$.

Air-heating heat exchange functions, which differ for each of the indoor units 40, 50, 60 and take into account the relationships of the air-conditioning (required) capabilities Q31, Q32, Q33 (Q41, Q42, Q43), airflow volumes Ga1, Ga2, Ga3, degrees of subcooling SC1, SC2, SC3, and temperature differences $\Delta Tcr1$, $\Delta Tcr2$, $\Delta Tcr3$ (the temperature difference between the indoor temperature Tr and the condensation temperature Tc) of each of the indoor units 40, 50, 60, are used to calculate the air-conditioning capabilities Q31, Q32, Q33 in step S21 and to calculate the condensation temperature differences $\Delta Tc1$, $\Delta Tc2$, $\Delta Tc3$ in step S24 or S25. These air-heating heat exchange functions are relational expressions associated with the air-conditioning (required) capabilities Q31, Q32, Q33 (Q41, Q42, Q43), airflow volumes Ga1, Ga2, Ga3, degrees of subcooling SC1, SC2, SC3, and temperature differences $\Delta Tcr1$, $\Delta Tcr2$, $\Delta Tcr3$ representing the characteristics of the indoor heat exchangers 42, 52, 62, and these functions are stored respectively in the memories $47c$, $57c$, $67c$ of the indoor-side control devices 47, 57, 67 of the indoor units 40, 50, 60. One variable among the air-conditioning (required) capabilities Q31, Q32, Q33 (Q41, Q42, Q43), airflow volumes Ga1, Ga2, Ga3, degrees of subcooling SC1, SC2, SC3, and temperature differences $\Delta Tcr1$. $\Delta Tcr2$, $\Delta Tcr3$ is determined respectively by inputting the other three variables into the air-heating heat exchange functions. The condensation temperature differences $\Delta Tc1$, $\Delta Tc2$, $\Delta Tc3$ can thereby be brought to the proper values with precision, and the target condensation temperature difference $\Delta Tct$ can be accurately determined. Therefore, excessive increases of the condensation temperature Tc can be prevented. Therefore, excess and deficiency in the air-conditioning capabilities of the indoor units 40, 50, 60 can be prevented, the optimal states of the indoor units 40, 50, 60 can be achieved quickly and stably, and a greater energy conservation effect can be exhibited.

The operating capacity of the compressor 21 is controlled on the basis of the target condensation temperature difference $\Delta Tct$ in this flow, but this control is not limited to the target condensation temperature difference $\Delta Tct$, the target value appointing unit $37a$ may appoint the maximum value of the requested condensation temperature Tcr calculated in the indoor units 40, 50, 60 as the target condensation temperature Tct, and the operating capacity of the compressor 21 may be controlled on the basis of the appointed target condensation temperature Tct.

The operation controls described above are performed by the operation control device 80 (more specifically, the indoor-side control devices 47, 57, 67, the outdoor-side control device 37, and the transmission line $80a$ connecting them) which functions as operation control means for performing normal operations including the air-cooling operation and the air-heating operation.

(2-3) Equalizing Indoor Unit Operating State

Next is a description of average temperature control, performed in order to prevent an unbalanced state in which some indoor units within the same group of indoor units are thermo-ON.

For this description, the indoor units 40, 50, 60 are designated as a single group AA. This description gives an example of a case in which within the group AA, the indoor unit 40 is a base unit. The indoor-side control devices 47, 57, 67 have the information that the respective indoor units 40, 50, 60 belong to the group AA, and the information that the indoor unit 40 is a base unit. The indoor-side control device 47 then acquires thermo-ON/thermo-OFF information of the indoor units 50, 60 from the indoor-side control devices 57, 67. Specifically, the set temperature, control temperature, and rated capacity of the indoor unit 50, as well as the set temperature, control temperature, and rated capacity of the indoor unit 60, are sent to the indoor-side control device 47 of the indoor unit 40.

In this example, a thermo-ON differential is the temperature difference between the set temperature and the temperature that switches the indoor unit from a thermo-OFF state to thermo-ON, and a thermo-OFF differential is the temperature difference between the set temperature and the temperature that switches the indoor unit from a thermo-ON state to thermo-OFF.

The indoor-side control device 47 carries out average temperature control for the indoor units belonging to the group AA. In average temperature control, the following formulas (1) and (2) are used to perform switching between thermo-ON and thermo-OFF simultaneously for all of the indoor units 40, 50, 60. In formulas (1) and (2), Tsn is the set temperature, Ts1, Ts2, and Ts3 are the respective set temperatures of the indoor units 40, 50, 60, Trn is the control temperature of the indoor units, Tr1, Tr2, and Tr3 are the respective control temperatures of the indoor units 40, 50, 60, Capn is the rated capacity of the indoor units, and Cap1, Cap2, and Cap3 are the rated capacities of the indoor units 40, 50, 60. The control temperatures Tr1, Tr2, Tr3 in this example are the temperatures detected by the indoor temperature sensors 46, 56, 66.

[Eq. 1]

$$\frac{\sum_n \{(Tsn - Trn) \times Capn\}}{\sum_n Capn} > 1 \qquad (1)$$

When formula (1) is satisfied, all the indoor units 40, 50, 60 are switched thermo-ON if air-cooling is in effect, and all the indoor units 40, 50, 60 are switched thermo-OFF if air-heating is in effect.

[Eq. 2]

$$\frac{\sum_n \{(Tsn - Trn) \times Capn\}}{\sum_n Capn} < -1 \qquad (2)$$

When formula (2) is satisfied, all the indoor units 40, 50, 60 are switched thermo-OFF if air-cooling is in effect, and all the indoor units 40, 50, 60 are switched thermo-ON if air-heating is in effect.

In the average temperature control described above, the thermo-ON differential is assumed to be 1° C. and the thermo-OFF differential is assumed to be −1° C., but the thermo-ON differential and the thermo-OFF differential are not limited to 1° C. and −1° C.

Figure 5:
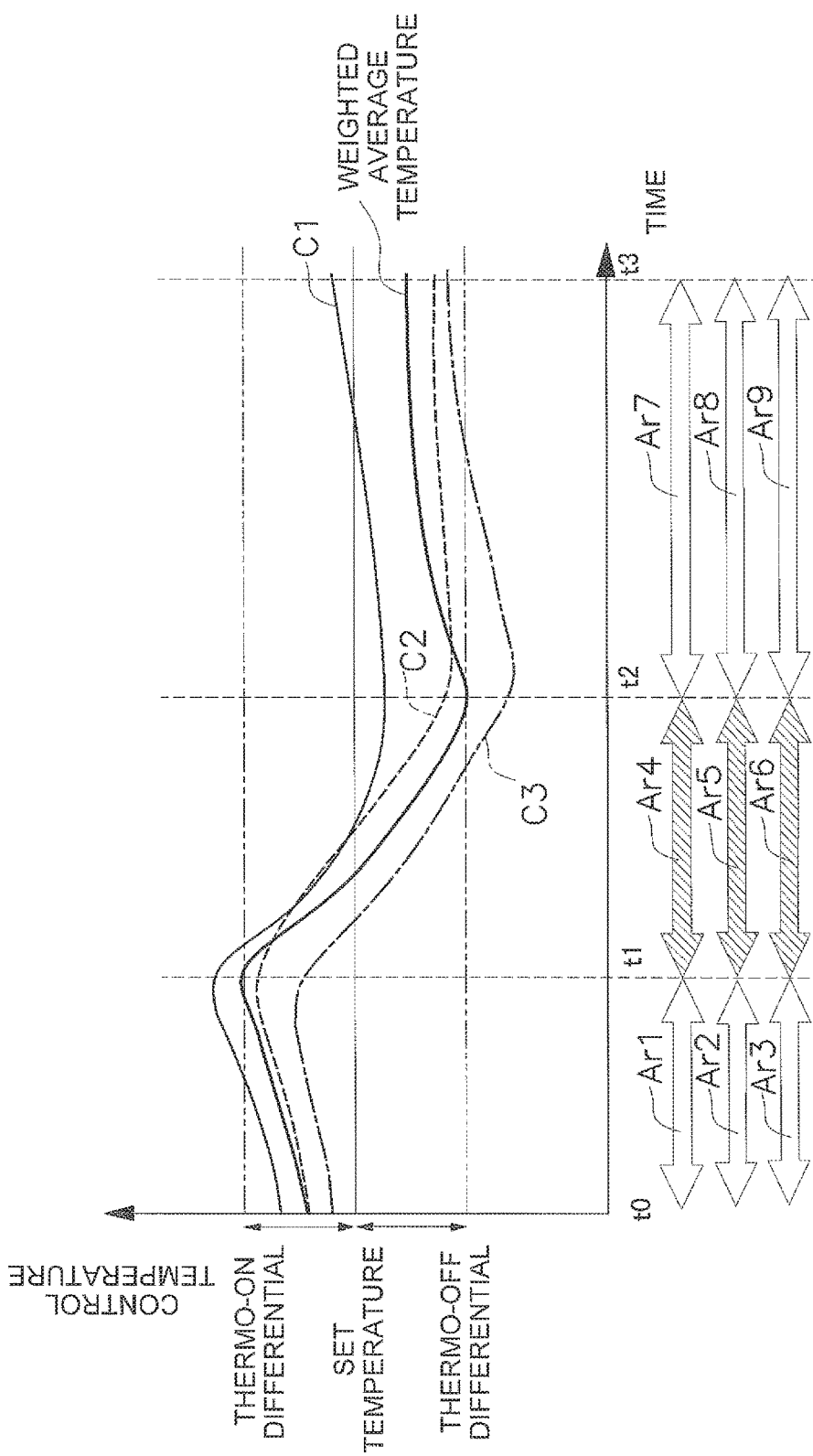
FIG. 5 is a graph for illustrating the actions of the indoor units under average temperature control.

FIG. 5 is a graph showing an example of a case in which the indoor units 40, 50, 60 are controlled by average temperature control during air-cooling. In FIG. 5, the curve C1 represents the control temperature of the indoor unit 40 (the temperature detected by the indoor temperature sensor 46), the curve C2 represents the control temperature of the indoor unit 50 (the temperature detected by the indoor temperature sensor 56), and the curve C3 represents the control temperature of the indoor unit 60 (the temperature detected by the indoor temperature sensor 66). Also in FIG. 5, the arrow Ar4 indicates the time period during which the indoor unit 40 is thermo-ON, and the arrows Ar1 and Ar7 indicate the time period during which the indoor unit 40 is thermo-OFF. The arrows Ar2 and Ar8 indicate the time period during which the indoor unit 50 is thermo-OFF, and the arrow Ar5 indicates the time period during which the indoor unit 50 is thermo-ON. The arrows Ar3 and Ar9 indicate the time period during which the indoor unit 60 is thermo-OFF, and the arrow Ar6 indicates the time period during which the indoor unit 60 is thermo-ON.

At time t0 shown in FIG. 5, the indoor units 40, 50, 60 are thermo-OFF. The indoor units 40, 50, 60 perform average temperature control. Therefore, the indoor unit 40, which is a base unit, uses the set temperatures, control temperatures, and rated capacities of the indoor units 40, 50, 60 to perform the computations on the left sides of the above formulas (1) and (2). From time t0 to t1, the indoor units 40, 50, 60 continue the thermo-OFF state because the results (weighted average temperatures C) of the left-side computations of the above formulas (1) and (2) are between −1 and 1.

At time t1, as a result of the computations of the above formulas (1) and (2), the indoor units 40, 50, 60 are all thermo-ON because the condition of formula (1) is satisfied.

From time t1 to time t2, as a result of average temperature control, the indoor units 40, 50, 60 continue to be in the thermo-ON state because the results of the left-side computations of the above formulas (1) and (2) are between −1 and 1.

At time t2, as a result of the computations of the above formulas (1) and (2), the indoor units 40, 50, 60 are all thermo-OFF because the condition of formula (2) is satisfied.

As described above, all of the indoor units 40, 50, 60 are temporarily thermo-ON from time t1 to time t2, and all of the indoor units 40, 50, 60 are temporarily thermo-OFF from time t1 to time t2 and from time t2 to time t3. The efficiency of the entire air conditioning apparatus 10 is thereby improved.

(3) Characteristics (3-1)

As described above, the indoor units 40, 50, 60 of the air conditioning apparatus 10 are installed in one room 1 (an example of the same indoor space). The indoor units 40, 50, 60 include respective indoor heat exchangers 42, 52, 62 (an example of the usage-side heat exchangers), and the indoor units are configured to be capable of setting the set temperatures individually. The indoor-side control devices 47, 57, 67 (an example of the control devices) use the set temperatures of the indoor units 40, 50, 60 under predetermined conditions to calculate a value of the left sides of the above formulas (1) and (2) (an example of the representative temperature related value) shared among the indoor units 40, 50, 60, using the formulas (1) and (2). Due to either of the above formulas (1) and (2) being satisfied, the indoor units 40, 50, 60 are simultaneously switched between thermo-ON and thermo-OFF (an example of a plurality of the indoor units being configured so as to be simultaneously switched between thermo-ON and thermo-OFF on the basis of the representative temperature related value).

At time t1, during which in normal individual temperature control there would be among the three indoor units 40, 50, 60 both those that are thermo-ON and those that are thermo-OFF, the number of thermo-ON indoor units can be increased by switching all the units to thermo-ON simultaneously, and the indoor heat exchangers 42, 52, 62 exchanging heat with the refrigerant circulating through the outdoor heat exchanger 23 (an example of the heat-source-side heat exchanger) can be increased. When the overall heat transfer area of the indoor heat exchangers 42, 52, 62 that are exchanging heat (the sum total of the heat transfer areas of the thermo-ON indoor heat exchangers 42, 52, 62) has increased, heat exchange can be balanced, and the pressure difference between the evaporation pressure and the condensation pressure of the air conditioning system can be lessened to improve the efficiency of the entire air conditioning system.

(3-2)

The outdoor-side control device 37 (an example of a control device) of the operation control device 80 appoints the operating conditions of the outdoor unit 20 so as to satisfy the highest increase requirement from among the requirements to increase air-conditioning capability from the indoor units 40, 50, 60. As a result, the outdoor unit 20 can be operated in response to the highest requirement of air-conditioning capability from among the indoor units 40, 50, 60, and the air-conditioning capability requirements of all the indoor units 40, 50, 60 can be met. Efficiency can thereby be improved while preventing deficiencies in air-conditioning capability in some indoor units.

(3-3)

The indoor-side control devices 47, 57, 67 of the operation control device 80, through the required temperature calculation units 47b, 57b, 67b, calculate, each indoor unite, the required evaporation temperatures or the required condensation temperatures of the indoor heat exchangers 42, 52, 62. The outdoor-side control device 37 of the operation control device 80 appoints a target evaporation temperature on the basis of the minimum value among the required evaporation temperatures of the indoor units 40, 50, 60 calculated in the required temperature calculation units 47b, 57b, 67b. Alternatively, the outdoor-side control device 37 of the operation control device 80, through the target value appointing unit 37a, appoints a target condensation temperature on the basis of the maximum value among the required condensation temperatures of the indoor units 40, 50, 60 calculated in the required temperature calculation units 47b, 57b, 67b. A target evaporation temperature or a target condensation temperature is thereby appointed for the outdoor unit 20 in response to the highest requirement of air-conditioning capability from among the indoor units 40, 50, 60, whereby a target evaporation temperature or target condensation temperature complying with the air-conditioning capability requirements of all the indoor units 40, 50, 60 can be appointed and efficiency can be improved while preventing deficiencies in air-conditioning capability in some indoor units.

(3-4)

Because the indoor-side control device 47 of the indoor unit 40, which is the base unit described above, uses the above formulas (1) and (2), rated capacities (an example of the degree of influence on the thermal environment of the indoor space) are derived from the differences between the set temperatures and the detected temperatures (an example of the control temperatures) of the respective indoor temperature sensors 46, 56, 66 of the indoor units 40, 50, 60. In other words, a weighted average value, which is weighted by the rated capacities, is used as the representative temperature related value. Emphasis can thereby be placed on the indoor unit that has the greatest rated capacity and the greatest degree of influence on the thermal environment of the indoor space, and the degree of influence of each of the indoor units 40, 50, 60 on the indoor environment can be reflected.

(3-5)

The indoor units 40, 50, 60 comprise respective indoor fans 43, 53, 63 (an example of the air blowers) of which the airflow volumes sent to the indoor heat exchangers 42, 52, 62 can be adjusted. The indoor-side control devices 47, 57, 67 adjust the indoor fans 43, 53, 63 for each indoor unit, reduce the airflow volumes if the air-conditioning capabilities are excessive, and increase the airflow volumes if the air-conditioning capabilities are insufficient. Through this manner of control, the indoor-side control devices 47, 57, 67 can autonomously adjust the air-conditioning capability of each indoor unit via the airflow volumes of the indoor fans 43, 53, 63, and can autonomously optimize the air-conditioning capability. The number of thermo-ON indoor units is increased by average temperature control, and although there are cases of excessive air-conditioning capability leading to temporary instances of poor efficiency, this autonomous optimization takes effect in these cases as well, suppressing the loss of efficiency.

(3-6)

The indoor units 40, 50, 60 comprise respective indoor expansion valves 41, 51, 61 (an example of the expansion mechanisms) capable of adjusting the degrees of superheat or the degrees of subcooling in the outlet sides of the indoor heat exchangers 42, 52, 62. The indoor-side control devices 47, 57, 67 adjust the opening degrees of the indoor expansion valves 41, 51, 61 in each indoor unit, reduce the degrees of superheat or the degrees of subcooling if the air-conditioning capabilities are excessive, and increase the degrees of superheat or the degrees of subcooling if the air-conditioning capabilities are insufficient. The air-conditioning capability can thus be autonomously adjusted in each indoor unit by adjusting the opening degrees of the indoor expansion valves 41, 51, 61. The number of thermo-ON indoor units is increased by average temperature control, and although there are cases of excessive air-conditioning capability leading to temporary instances of poor efficiency, this autonomous optimization takes effect in these cases as well, suppressing the loss of efficiency.

(4) Modifications (4-1) Modification 1A

In the above embodiment, weightings are assigned with rated capacities, but can also be assigned with the air-conditioning capabilities (an example of the degree of influence on the thermal environment of the indoor space) of the indoor units 40, 50, 60 instead of the rated capacities. In this case, e.g., the following formulas (3) and (4) are used instead of the above formulas (1) and (2). In other words, a weighted average value (the value of the left sides of the following formulas (3) and (4)), which is weighted by air-conditioning capabilities, is used as the representative temperature related value. Emphasis can thereby be placed on indoor units that have greater air-conditioning capabilities and greater degrees of influence on the thermal environment of the indoor space at the point in time when the computations of formula (3) and/or (4) are made, and the degree of influence on the indoor environment of each of the indoor units 40, 50, 60 can be reflected. The air-conditioning capabilities can be calculated from, e.g., the operating conditions of the indoor units at that point in time. In formulas (3) and (4), ACapn represents the air-conditioning capabilities of the indoor units, with ACap1, ACap2, and ACap3 being the air-conditioning capability of each respective indoor unit 40, 50, 60.

[Eq. 3]

$$\frac{\sum_n \{(Tsn - Trn) \times ACapn\}}{\sum_n ACapn} > 1 \qquad (3)$$

When formula (3) is satisfied, all the indoor units 40, 50, 60 are switched thermo-ON if air-cooling is in effect, and all the indoor units 40, 50, 60 are switched thermo-OFF if air-heating is in effect.

[Eq. 4]

$$\frac{\sum_n \{(Tsn - Trn) \times ACapn\}}{\sum_n ACapn} < -1 \qquad (4)$$

When formula (4) is satisfied, all the indoor units 40, 50, 60 are switched thermo-OFF if air-cooling is in effect, and all the indoor units 40, 50, 60 are switched thermo-ON if air-heating is in effect.

Figure 6:
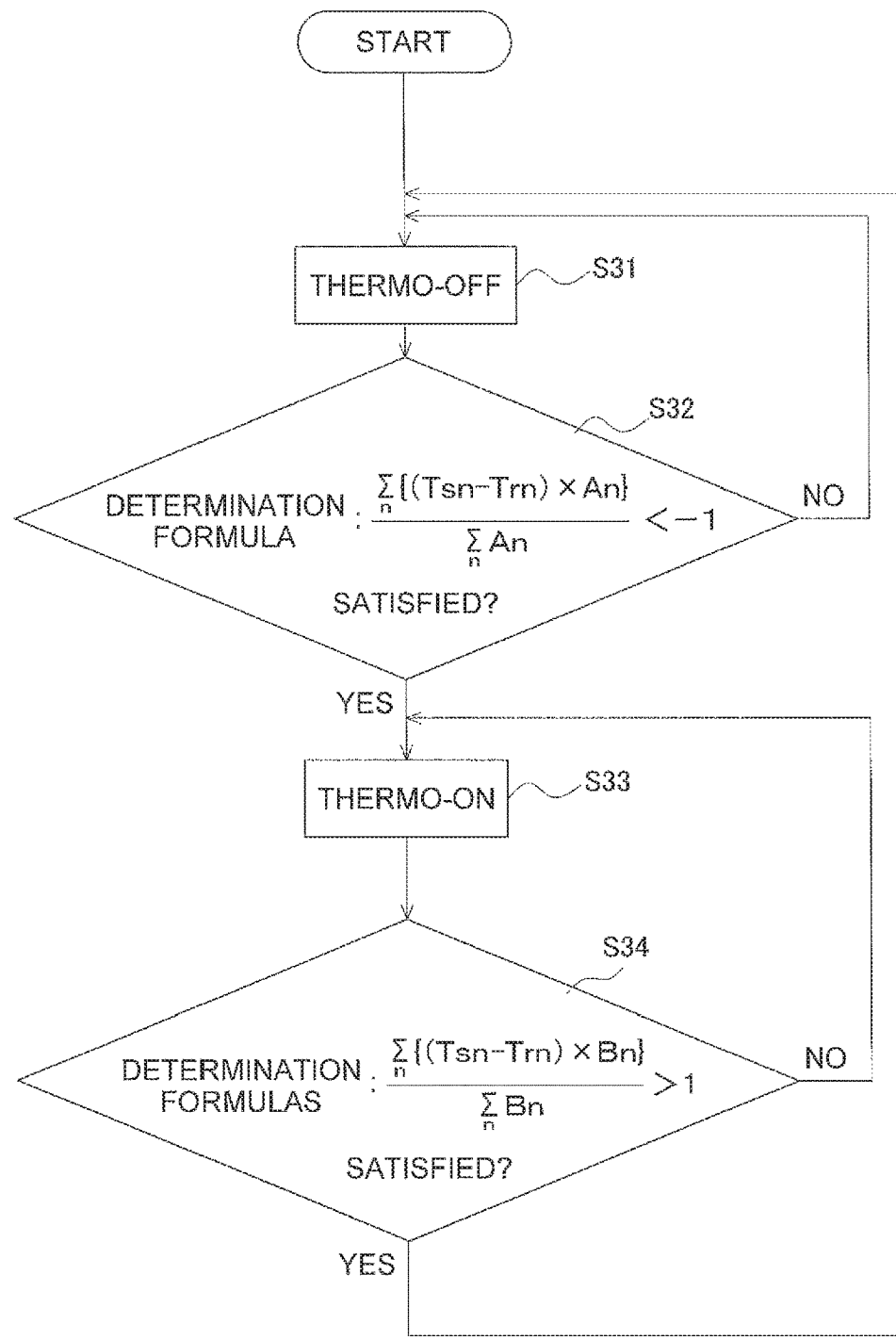
FIG. 6 is a flowchart showing an example of average temperature control during air-cooling using different weighted index values for a thermo-OFF assessment and a thermo-ON assessment.

In the case of Modification 1A, the above-described air-conditioning capabilities cannot be calculated while the indoor units 40, 50, 60 are thermo-OFF. Consequently, while the indoor units 40, 50, 60 are thermo-OFF (step S31 in FIG. 6), either control is performed using, e.g., the rated capacities based on the computation of formula (1) and/or formula (2) or another index value that is not affected by the indoor units being thermo-ON or thermo-OFF (step S32 in FIG. 6), or the air-conditioning capability values of the previous instance of thermo-ON are stored as data and the computations of formulas (3) and (4) are performed using these values. In FIG. 6, the letters An represent the rated capacity, occupant density, a weighting set value, or another index value that is not influenced by whether the indoor unit is thermo-ON or thermo-OFF, and the letters Bn represent an index value that is influenced by whether the indoor unit is thermo-ON or thermo-OFF, which is the air-conditioning capability in this case. In other words, while the indoor units 40, 50, 60 are thermo-ON (step S33 in FIG. 6), control is performed according to the computation of formula (3) and/or (4), using the air-conditioning capabilities as an index value (step S34 in FIG. 6).

(4-2) Modification 1B

In the above embodiment, weightings are assigned with rated capacities, but can also be assigned with the airflow volumes (an example of the degree of influence on the thermal environment of the indoor space) of the indoor units 40, 50, 60 instead of the rated capacities. In this case, e.g., the following formulas (5) and (6) are used instead of the above formulas (1) and (2). In other words, a weighted average value (the value of the left sides of the following formulas (5) and (6)), which is weighted by airflow volumes is used as the representative temperature related value. Emphasis can thereby be placed on indoor units that have greater airflow volumes and greater degrees of influence on the thermal environment of the indoor space, and the degree of influence on the indoor environment of each of the indoor units 40, 50, 60 can be reflected. In formulas (5) and (6), AVon represents the airflow volumes of the indoor units, with AVo1, AVo2, and AVo3 being the airflow volume of each respective indoor unit 40, 50, 60.

[Eq. 5]

$$\frac{\sum_n \{(Tsn - Trn) \times AVon\}}{\sum_n AVon} > 1 \quad (5)$$

When formula (5) is satisfied, all the indoor units 40, 50, 60 are switched thermo-ON if air-cooling is in effect, and all the indoor units 40, 50, 60 are switched thermo-OFF if air-heating is in effect.

[Eq. 6]

$$\frac{\sum_n \{(Tsn - Trn) \times AVon\}}{\sum_n AVon} < -1 \quad (6)$$

When formula (6) is satisfied, all the indoor units 40, 50, 60 are switched thermo-OFF if air-cooling is in effect, and all the indoor units 40, 50, 60 are switched thermo-ON if air-heating is in effect.

In cases using Modification 1B, similar to cases using Modification 1A, the above-described airflow volumes cannot be calculated while the indoor units 40, 50, 60 are thermo-OFF (step S31 in FIG. 6). Consequently, while the indoor units 40, 50, 60 are thermo-OFF, either control is performed using, e.g., the rated capacities based on the computation of formula (1) and/or formula (2) or another index value that is not affected by the indoor units being thermo-ON or thermo-OFF (step S32 in FIG. 6), or the airflow volume values of the last instance of thermo-ON are stored as data and the computations of formulas (5) and (6) are performed using these values. The letters Bn here represent an index value that is influenced by whether the indoor unit is thermo-ON or thermo-OFF, which is the airflow volume in this case. In other words, while the indoor units 40, 50, 60 are thermo-ON (step S33 in FIG. 6), control is performed according to the computation of formula (5) and/or (6), using the airflow volumes as an index value (step S34 in FIG. 6).

(4-3) Modification 1C

In the above embodiment, weightings are assigned with rated capacities, but weightings can also be assigned with the occupant densities (an example of the degree of influence on the thermal environment of the indoor space) in the areas surrounding the indoor units 40, 50, 60 instead of the rated capacities. In this case, e.g., the following formulas (7) and (8) are used instead of the above formulas (1) and (2). In other words, a weighted average value (the value of the left sides of the following formulas (7) and (8)), which is weighted by occupant densities, is used as the representative temperature related value. Emphasis can thereby be placed on indoor units that have greater occupant densities and greater degrees of influence on the comfort of the occupants, and the degree of influence on the indoor environment of each of the indoor units 40, 50, 60 can be reflected. In formulas (7) and (8), SDn represents the occupant densities of the indoor units, with SD1, SD2, and SD3 being the occupant densities of each respective indoor unit 40, 50, 60. To measure occupant densities, for example, human detection sensors, etc., are provided to the indoor units 40, 50, 60, and the number of people detected is designated as the occupant density for each of the indoor-side control devices 47, 57, 67. Alternatively, the number of people detected within the area of the space within range of the human detection sensor may be divided to find the occupant density.

[Eq. 7]

$$\frac{\sum_n \{(Tsn - Trn) \times SDn\}}{\sum_n SDn} > 1 \quad (7)$$

When formula (7) is satisfied, all the indoor units 40, 50, 60 are switched thermo-ON if air-cooling is in effect, and all the indoor units 40, 50, 60 are switched thermo-OFF if air-heating is in effect.

[Eq. 8]

$$\frac{\sum_n \{(Tsn - Trn) \times SDn\}}{\sum_n SDn} < -1 \quad (8)$$

When formula (8) is satisfied, all the indoor units 40, 50, 60 are switched thermo-OFF if air-cooling is in effect, and all the indoor units 40, 50, 60 are switched thermo-ON if air-heating is in effect.

(4-4) Modification 1D

In the above embodiment, weightings are assigned with rated capacities, but weightings can also be assigned with the weighting set values (an example of the degree of influence on the comfort of the occupants in the indoor space) of the indoor units 40, 50, 60 instead of the rated capacities. In this case, e.g., the following formulas (9) and (10) are used instead of the above formulas (1) and (2). In other words, a weighted average value (the value of the left sides of the following formulas (9) and (10)), which is weighted by weighting set values, is used as the representative temperature related value. Emphasis can thereby be placed on indoor units that have greater weighting set values and greater degrees of influence on the comfort of the occupants, and the degree of influence on the indoor environment of each of the indoor units 40, 50, 60 can be reflected. In formulas (9) and (10), WP represents the weighting set values of the indoor units, with WP1, WP2, and WP3 being the weighting set value of each respective indoor unit 40, 50, 60. The weighting set values can be configured so that, e.g., they can be inputted into the indoor-side control devices 47, 57, 67 of the indoor units 40, 50, 60 by a remote controller or the like.

[Eq. 9]

$$\frac{\sum_n \{(Tsn - Trn) \times WPn\}}{\sum_n WPn} > 1 \tag{9}$$

When formula (9) is satisfied, all the indoor units 40, 50, 60 are switched thermo-ON if air-cooling is in effect, and all the indoor units 40, 50, 60 are switched thermo-OFF if air-heating is in effect.

[Eq. 10]

$$\frac{\sum_n \{(Tsn - Trn) \times WPn\}}{\sum_n WPn} < -1 \tag{10}$$

When formula (10) is satisfied, all the indoor units 40, 50, 60 are switched thermo-OFF if air-cooling is in effect, and all the indoor units 40, 50, 60 are switched thermo-ON if air-heating is in effect.

(4-5) Modification 1E

In the above embodiment, the computations of the above formulas (1) and (2) are performed by the indoor-side control device 47 of the indoor unit 40, which is a base unit. However, the computations of the above formulas (1) and (2) and/or the accompanying average temperature control may be performed by the outdoor-side control device 37.

(4-6) Modification 1F

In the above embodiment, the indoor-side control devices 47, 57, 67, or the operation control device 80 including the indoor-side control devices 47, 57, 67 and the outdoor-side control device 37, were given as examples of control devices, but examples of control devices are not limited thereto; the control devices may be centralized controllers which acquire data from the outdoor unit 20 and the indoor units 40, 50, 60, and which provide data to the outdoor unit 20 and the indoor units 40, 50, 60. The entire air conditioning system is easily harmonized by the unifying management of the centralized controllers.

(4-7) Modification 1G

In the above embodiment, FIG. 6 was used to describe cases of using different index values during thermo-OFF and thermo-ON. However, differentiating the use of different index values is not limited to cases of thermo-ON and thermo-OFF. For example, weightings can be assigned with the rated capacities for a predetermined time after the start of operation, and weightings can be assigned with the occupant densities after the predetermined time has elapsed. The switching of index values for such weightings can be adapted to various scenarios by performing diverse condition settings.

(4-8) Modification 1H

In the above embodiment, only one index value is used in each of the determination formulas, but a plurality of index values can also be used simultaneously in the determination formulas. To give a general depiction of this concept, formulas (11) and (12) are used.

[Eq. 11]

$$\frac{\sum_n \{(Tsn - Trn) \times f(x1n, x2n)\}}{\sum_n f(x1n, x2n)} > 1 \tag{11}$$

When formula (11) is satisfied, all the indoor units 40, 50, 60 are switched thermo-ON if air-cooling is in effect, and all the indoor units 40, 50, 60 are switched thermo-OFF if air-heating is in effect.

[Eq. 12]

$$\frac{\sum_n \{(Tsn - Trn) \times f(x1n, x2n)\}}{\sum_n f(x1n, x2n)} < -1 \tag{12}$$

When formula (12) is satisfied, all the indoor units 40, 50, 60 are switched thermo-OFF if air-cooling is in effect, and all the indoor units 40, 50, 60 are switched thermo-ON if air-heating is in effect.

In the above formulas (11) and (12), the variables $x1n$, $x2n$ can be the rated capacities $Cap_n$ of the indoor units, the air-conditioning capabilities $ACap_n$ of the indoor units, the airflow volumes $Avo_n$ of the indoor units, the occupant densities $SD_n$ of the indoor units, or the weighting set values WP of the indoor units. For example, two types of index values can be multiplied to form a new index value, such as $f(x1n, x2n) = Cap_n \times SD_n$. A case was described herein which two variables are multiplied, but three or more types of variables may also be used, and the function is not limited to the variables being multiplied together.

(4-9) Modification 1I

In the above embodiment, a case was described in which average temperature control is continually performed, but in cases in which individual temperature control is performed in which the indoor units 40, 50, 60 of group AA in the same indoor space perform temperature control individually as in conventional practice, when either there is a mixture of both thermo-ON indoor units and thermo-OFF indoor units, or there is a mixture of both and a predetermined condition has been satisfied, the control may be switched from individual temperature control to average temperature control. An example of switching when there is a mixture of both and a predetermined condition has been satisfied is a configuration in which, when there are, among the indoor units 40, 50, 60 of group AA during individual temperature control, both indoor units that have continued to be thermo-ON for at least a first predetermined time (e.g., ten minutes or more) and also indoor units that have continued to be thermo-OFF for a second predetermined time (e.g., then minutes or more), control is switched from individual temperature control to average temperature control. In this case, control is preferably returned from average temperature control to individual temperature control after average temperature control has been performed for, e.g., a third predetermined time.

What is claimed is:
1. An air conditioning system, comprising:
a plurality of indoor units installed in a same indoor space, the indoor units including respective usage-side heat exchangers and being configured such that set temperatures are set individually;
an outdoor unit including a heat-source-side heat exchanger arranged and configured to conduct heat exchange with refrigerant circulating through the usage-side heat exchangers; and
a control device configured
to calculate a representative temperature related value shared by indoor units using the set temperatures of the indoor units, and
to switch the indoor units between thermo-ON and thermo-OFF in a case where the representative temperature related value is greater than a first predetermined value or smaller than a second predetermined value, the first predetermined value being greater than the second predetermined value,
the control device calculating the representative temperature related value based on a plurality of temperature differences between the set temperatures and control temperatures in the indoor units.

2. The air conditioning system according to claim 1, wherein
the control device appoints an operating condition of the outdoor unit so as to satisfy a highest increase requirement of requirements to increase air-conditioning capability from the indoor units.

3. The air conditioning system according to claim 2, wherein
the control device has
required temperature calculation units configured to calculate a required evaporation temperature or a required condensation temperature of the usage-side heat exchanger for each of the indoor units, and
a target value appointing unit configured to appoint
a target evaporation temperature based on a minimum value of the required evaporation temperatures of the indoor units calculated in the required temperature calculation units; or
a target condensation temperature based on a maximum value of the required condensation temperatures of the indoor units calculated in the required temperature calculation units.

4. The air conditioning system according to claim 1, wherein
the control device uses a weighted average value as the representative temperature related value, and
the weighted average value is found from the temperature differences between the respective control temperatures and set temperatures of the indoor units and are weighted in accordance with at least one of a degree of influence on a thermal environment of the indoor space and a degree of influence on comfort of the occupants of the indoor space.

5. An air conditioning system comprising:
a plurality of indoor units installed in a same indoor space, the indoor units including respective usage-side heat exchangers and being configured such that set temperatures are set individually;
an outdoor unit including a heat-source-side heat exchanger arranged and configured to conduct heat exchange with refrigerant circulating through the usage-side heat exchangers; and
a control device configured
to calculate a representative temperature related value shared by the indoor units using the set temperatures of the indoor units, and
to switch the indoor units between thereto-ON and thereto-OFF in a case where the representative temperature related value is greater than a first predetermined value or smaller than a second predetermined value, the first predetermined value being greater than the second predetermined value,
the control device using as the representative temperature related value a weighted average value weighted according to at least one of
a degree of influence on a thermal environment of the indoor space and
a degree of influence on comfort of occupants in the indoor space with respect to the differences between respective control temperatures and the set temperatures of the indoor units, and
the degree of influence on the thermal environment of the indoor space being a rated capacity of each indoor unit.

6. An air conditioning system comprising:
a plurality of indoor units installed in a same indoor space, the indoor units including respective usage-side heat exchangers and being configured such that set temperatures are set individually;
an outdoor unit including a heat-source-side heat exchanger arranged and configured to conduct heat exchange with refrigerant circulating through the usage-side heat exchangers; and
a control device configured
to calculate a representative temperature related value shared by the indoor units using the set temperatures of the indoor units, and
to switch the indoor units between thermo-ON and thermo-OFF in a case where the representative temperature related value is greater than a first predetermined value or smaller than a second predetermined value, the first predetermined value being greater than the second predetermined value,
the control device using as the representative temperature related value a weighted average value weighted according to at least one of
a degree of influence on a thermal environment of the indoor space and
a degree of influence on comfort of occupants in the indoor space with respect to the differences between respective control temperatures and the set temperatures of the indoor units, and
the degree of influence on the thermal environment of the indoor space being an air-conditioning capability of each indoor unit.

7. An air conditioning system comprising:
a plurality of indoor units installed in a same indoor space, the indoor units including respective usage-side heat exchangers and being configured such that set temperatures are set individually;
an outdoor unit including a heat-source-side heat exchanger arranged and configured to conduct heat exchange with refrigerant circulating through the usage-side heat exchangers; and a control device configured
- to calculate a representative temperature related value shared by the indoor units using the set temperatures of the indoor units, and
- to switch the indoor units between thereto-ON and thermo-OFF in a case where the representative temperature related value is greater than a first predetermined value or smaller than a second predetermined value, the first predetermined value being greater than the second predetermined value,
- the control device using as the representative temperature related value a weighted average value weighted according to at least one of
  - a degree of influence on a thermal environment of the indoor space and
  - a degree of influence on comfort of occupants in the indoor space with respect to the differences between respective control temperatures and the set temperatures of the indoor units, and
  - the degree of influence on the thermal environment of the indoor space being an airflow volume of each indoor unit.

8. The air conditioning system according to claim 4, wherein
the weighted average value is weighted according to an occupant density in the area surrounding each indoor unit.

9. An air conditioning system comprising:
a plurality of indoor units installed in a same indoor space, the indoor units including respective usage-side heat exchangers and being configured such that set temperatures are set individually;
an outdoor unit including a heat-source-side heat exchanger arranged and configured to conduct heat exchange with refrigerant circulating through the usage-side heat exchangers; and
a control device configured
- to calculate a representative temperature related value shared by the indoor units using the set temperatures of the indoor units, and
- to switch the indoor units between thereto-ON and thereto-OFF in a case where the representative temperature related value is greater than a first predetermined value or smaller than a second predetermined value, the first predetermined value being greater than the second predetermined value,
- the control device using as the representative temperature related value a weighted average value weighted according to at least one of
  - a degree of influence on a thermal environment of the indoor space and
  - a degree of influence on comfort of occupants in the indoor space with respect to the differences between respective control temperatures and the set temperatures of the indoor units, and
  - the degree of influence on comfort of occupants in the indoor space being a weighting set value of each indoor unit.

10. The air conditioning system according to claim 1, wherein
the indoor units further include respective air blowers useable to adjust airflow volumes directed to the usage-side heat exchangers; and
the control device adjusts the air blowers of the indoor units to reduce the airflow volumes when air-conditioning capabilities are excessive and to increase the airflow volumes when the air-conditioning capabilities are insufficient.

11. The air conditioning system according to claim 1, wherein
the indoor units further include respective expansion mechanisms configured to adjust degrees of superheat or degrees of subcooling in outlet sides of the usage-side heat exchangers; and
the control device adjusts the opening degrees of the expansion mechanisms in the indoor units to reduce the degrees of superheat or degrees of subcooling when air-conditioning capabilities are excessive and to increase the degrees of superheat or degrees of subcooling when the air-conditioning capabilities are insufficient.

12. The air conditioning system according to claim 1, wherein
the control device is a centralized controller that acquires data from the outdoor unit and the indoor units and sends data to the outdoor unit and the indoor units.

13. A method for controlling an air conditioning system including
a plurality of indoor units installed in a same indoor space, the indoor units including respective usage-side heat exchangers and being configured such that set temperatures are set individually, and
an outdoor unit including a heat-source-side heat exchanger arranged and configured to conduct heat exchange with refrigerant circulating through the usage-side heat exchangers, the method comprising:
calculating a representative temperature related value shared by the indoor units using the set temperatures of the indoor units; and
simultaneously switching the indoor units between thermo-ON and thermo-OFF in a case where the representative temperature related value is greater than a first predetermined value or smaller than a second predetermined value, the first predetermined value being greater than the second predetermined value,
the calculation of the representative temperature related value being performed based on a plurality of temperature differences between the set temperatures and control temperatures in the indoor units.

* * * * *